US009116611B2

(12) United States Patent
Seymour et al.

(10) Patent No.: US 9,116,611 B2
(45) Date of Patent: Aug. 25, 2015

(54) DEVICES, METHODS, AND GRAPHICAL USER INTERFACES FOR PROVIDING MULTITOUCH INPUTS AND HARDWARE-BASED FEATURES USING A SINGLE TOUCH INPUT

(75) Inventors: Eric T. Seymour, San Jose, CA (US); Christopher B. Fleizach, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 614 days.

(21) Appl. No.: 13/436,340

(22) Filed: Mar. 30, 2012

(65) Prior Publication Data

US 2013/0169549 A1 Jul. 4, 2013

Related U.S. Application Data

(60) Provisional application No. 61/581,617, filed on Dec. 29, 2011.

(51) Int. Cl.
*G06F 3/048* (2013.01)
*G06F 3/0488* (2013.01)

(52) U.S. Cl.
CPC ..................... *G06F 3/0488* (2013.01)

(58) Field of Classification Search
CPC ................. G06F 3/0488; G06F 3/041; G06F 2203/04808
USPC .......................................... 345/173; 715/863
See application file for complete search history.

(56) References Cited

U.S. PATENT DOCUMENTS

| 2009/0178011 A1* | 7/2009 | Ording et al. ................. 715/863 |
| 2009/0213083 A1* | 8/2009 | Dicker et al. ................. 345/173 |
| 2009/0225042 A1* | 9/2009 | Andrews et al. ............... 345/173 |
| 2009/0228792 A1 | 9/2009 | van Os et al. |
| 2010/0095234 A1* | 4/2010 | Lane et al. ..................... 715/773 |
| 2010/0149114 A1* | 6/2010 | Li ................................. 345/173 |
| 2011/0004853 A1* | 1/2011 | Chang ........................... 715/863 |
| 2011/0096087 A1* | 4/2011 | Chun ............................. 345/592 |
| 2011/0248928 A1* | 10/2011 | Michaelraj .................... 345/173 |
| 2011/0300910 A1 | 12/2011 | Choi |
| 2012/0262489 A1* | 10/2012 | Caliendo et al. .............. 345/652 |
| 2013/0019182 A1* | 1/2013 | Gil et al. ....................... 715/738 |

FOREIGN PATENT DOCUMENTS

WO   WO 2012/170426   12/2012

OTHER PUBLICATIONS

Office Action dated Aug. 13, 2013, received in Australian Patent Application No. 2012238305, which corresponds to U.S. Appl. No. 13/436,340, 3 pages (Seymour).

* cited by examiner

*Primary Examiner* — Amy Ng
*Assistant Examiner* — Sajeda Muhebbullah
(74) *Attorney, Agent, or Firm* — Morrison & Foerster LLP

(57) ABSTRACT

An electronic device with a display and a touch-sensitive surface displays, on the display, a first visual indicator. The electronic device receives a first single touch input on the touch-sensitive surface at a location that corresponds to the first visual indicator; and, in response to detecting the first single touch input on the touch-sensitive surface at a location that corresponds to the first visual indicator, replaces display of the first visual indicator with display of a first menu. The first menu includes a virtual touches selection icon. In response to detecting selection of the virtual touches selection icon, the electronic device displays a menu of virtual multi-touch contacts.

19 Claims, 38 Drawing Sheets

600

602 Display, on a display, a first visual indicator

604 The first visual indicator is configured to move in accordance with a touch gesture by a single touch on a touch-sensitive surface

606 The first visual indicator is located at a periphery of the display when no touch input is detected on the touch-sensitive surface

608 Detecting a first single touch input on the touch-sensitive surface at a location that corresponds to the first visual indicator

610 In response to detecting the first single touch input on the touch-sensitive surface at the location that corresponds to the first visual indicator, replace display of the first visual indicator with display of a first menu. The first menu includes a virtual touches selection icon. In response to detecting selection of the virtual touches selection icon, a menu of virtual multitouch contacts is displayed.

612 The first menu includes icons displayed radially about a center of the first menu

614 A first user interface is displayed on the display immediately prior to detecting the first single touch input on the touch-sensitive surface, and the first menu is displayed over the first user interface

616 In response to detecting the first single touch input, display the first menu in a center region of the display

618 While displaying the first menu on the display, detect a second single touch input on the touch-sensitive surface at a location that does not correspond to the first menu. In response to detecting the second single touch input on the touch-sensitive surface, replace display of the first menu with display of the first visual indicator.

620 While displaying the first menu on the display, wait to detect input on the touch-sensitive surface for more than a predefined time period; and, in response to waiting to detect input on the touch-sensitive surface for more than the predefined time period, replace display of the first menu with display of the first visual indicator

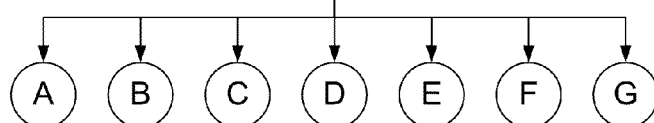

Figure 6A

622 Detect selection of the virtual touches selection icon. In response to detecting selection of the virtual touches selection icon, display the menu of virtual multitouch contacts. The menu of virtual multitouch contacts includes a plurality of icons representing types of virtual multitouch contacts. Detect selection of a respective virtual multitouch contacts icon in the menu of virtual multitouch contacts. In response to detecting selection of the respective virtual multitouch contacts icon in the menu of virtual multitouch contacts, display one or more second visual indicators that correspond to the respective virtual multitouch contacts icon.

624 Displaying the second visual indicators includes displaying a number of visual indicators that correspond to the respective virtual multitouch contacts icon 626 In response to detecting selection of the respective virtual multitouch contacts icon in the menu of virtual multitouch contacts, cease to display the menu of virtual multitouch contacts and redisplaying the first visual indicator 628 While displaying the one or more second visual indicators, detect a third single touch on the touch-sensitive surface. In response to detecting the third single touch on the touch-sensitive surface: move the one or more second visual indicators to a first display location on the display, the first display location corresponding to an initial location of the third single touch on the touch-sensitive surface; and detect movement of the third single touch across the touch-sensitive surface. In response to detecting the movement of the third single touch across the touch-sensitive surface, move the one or more second visual indicators on the display in accordance with the movement of the third single touch across the touch-sensitive surface. While moving the one or more second visual indicators in accordance with the movement of the third single touch across the touch-sensitive surface, perform an operation that corresponds to the movement of the one or more second visual indicators in accordance with the movement of the third single touch across the touch-sensitive surface.

Figure 6B

630 Display a virtual gestures icon. Detect selection of the virtual gestures icon. In response to detecting selection of the virtual gestures icon, display a menu of virtual gestures. The menu of virtual gestures includes a plurality of icons representing types of virtual gestures. Detect selection of a respective virtual gesture icon in the menu of virtual gestures. In response to detecting selection of the respective virtual gesture icon in the menu of virtual gestures, perform an action that corresponds to the respective virtual gesture.

632 Display a virtual gestures icon. Detect selection of the virtual gestures icon. In response to detecting selection of the virtual gestures icon, display a menu of virtual gestures. The menu of virtual gestures includes a plurality of icons representing types of virtual gestures. Detect selection of a respective virtual gesture icon in the menu of virtual gestures. In response to detecting selection of the respective virtual gesture icon in the menu of virtual gestures, display a number of visual indicators that correspond to the respective virtual gesture icon. Detect a fourth single touch input on the touch-sensitive surface. In response to detecting the fourth single touch input on the touch-sensitive surface, perform an operation in accordance with the respective virtual gesture.

634 In response to detecting the fourth single touch input on the touch-sensitive surface, move the displayed visual indicators that correspond to the respective virtual gesture to simulate movement of multiple contacts on the touch sensitive surface

636 Display a pinch/depinch gesture icon. Detect selection of the virtual pinch/depinch gesture icon. In response to detecting selection of the virtual pinch/depinch gesture icon, display two visual indicators that correspond to contacts in the virtual pinch/depinch gesture. Detect a fifth single touch input on the touch-sensitive surface. In response to detecting the fifth single touch input on the touch-sensitive surface, perform an operation in accordance with the virtual pinch/depinch gesture.

638 A zooming operation is performed in accordance with the virtual pinch/depinch gesture

Figure 6C

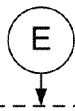

640 Display a virtual device icon. Detect selection of the virtual device icon. In response to detecting selection of the virtual device icon, display a menu of virtual device operations. The menu of virtual device operations includes a plurality of icons representing types of virtual device operations. Detect selection of a respective virtual device operation icon in the menu of virtual device operations. In response to detecting selection of the respective virtual device operation icon in the menu of virtual device operations, perform an action that corresponds to the respective virtual device operation.

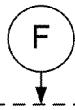

642 Display a virtual device rotation icon. Detect selection of the virtual device rotation icon. In response to detecting selection of the virtual device rotation icon, display a menu of virtual device orientations. The menu of virtual device orientations includes a plurality of icons representing types of virtual device orientations. Detect selection of a respective virtual device orientation icon in the menu of virtual device orientations. In response to detecting selection of the respective virtual device orientation icon in the menu of virtual device orientations, orient the display in accordance with the respective virtual device orientation.

644 The device includes a home button. Display a home button icon. Detect selection of the home button icon. In response to detecting selection of the home button icon, perform an action that corresponds to activation of the home button.

Figure 6D

DEVICES, METHODS, AND GRAPHICAL USER INTERFACES FOR PROVIDING MULTITOUCH INPUTS AND HARDWARE-BASED FEATURES USING A SINGLE TOUCH INPUT

RELATED APPLICATION

This claims priority to U.S. Provisional Patent Application Ser. No. 61/581,617, filed Dec. 29, 2011, entitled "Devices, Methods, and Graphical User Interfaces for Providing Multitouch Inputs Using a Single Touch Input," which is incorporated by reference herein in its entirety.

TECHNICAL FIELD

This relates generally to electronic devices with multitouch-sensitive surfaces, including but not limited to electronic devices with multitouch-sensitive surfaces that have touch-based user interfaces and other hardware-based features that require manual dexterity.

BACKGROUND

The use of electronic devices with touch-based user interfaces (e.g., devices such as the iPhone®, iPod Touch®, and iPad® devices from Apple Inc. of Cupertino, Calif.) has increased significantly in recent years. These devices use multitouch-sensitive surfaces, such as a touch screen display or a touch pad, as the main input for manipulating user interface objects on a display and/or controlling the device. These devices also have a number of features that require fine manual motor coordination, such as rotating or shaking the devices for activation of such features.

But people with limited motor skills, such as those with certain finger or hand impairments, may find performing multitouch gestures (e.g., two-finger pinch/depinch gestures or other gestures that require two or more simultaneous finger contacts) difficult, if not impossible. Additionally, these users may have trouble rotating the device, grasping the device, shaking the device, or pressing various physical buttons on the device.

SUMMARY

Accordingly, there is a need to provide accessibility to devices with touch-based user interfaces that include multitouch gestures to users that can perform inputs with only a single touch (e.g., a single finger or other single contact). In other words, there is a need to enable users who can operate touch-sensitive surfaces with just a single contact to nevertheless operate electronic devices with touch-based user interfaces configured to receive multitouch gestures. In addition, there is a need to enable users who can operate touch-sensitive surfaces with just a single contact to nevertheless operate other hardware-based features that require manual dexterity.

The above deficiencies and other problems associated with user interfaces for electronic devices with multitouch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a non-transitory computer readable storage medium or other computer program product configured for execution by one or more processors.

In accordance with some embodiments, a method is performed at an electronic device with a display and a touch-sensitive surface. The method includes: displaying, on the display, a first visual indicator; detecting a first single touch input on the touch-sensitive surface at a location that corresponds to the first visual indicator; and, in response to detecting the first single touch input on the touch-sensitive surface at the location that corresponds to the first visual indicator, replacing display of the first visual indicator with display of a first menu. The first menu includes a virtual touches selection icon. In response to detecting selection of the virtual touches selection icon, a menu of virtual multitouch contacts is displayed.

In accordance with some embodiments, an electronic device includes a display, a touch-sensitive surface, one or more processors, memory, and one or more programs. The one or more programs are stored in the memory and configured to be executed by the one or more processors. The one or more programs include instructions for: displaying, on the display, a first visual indicator; detecting a first single touch input on the touch-sensitive surface at a location that corresponds to the first visual indicator; and, in response to detecting the first single touch input on the touch-sensitive surface at the location that corresponds to the first visual indicator, replacing display of the first visual indicator with display of a first menu. The first menu includes a virtual touches selection icon. In response to detecting selection of the virtual touches selection icon, a menu of virtual multitouch contacts is displayed.

In accordance with some embodiments, a computer readable storage medium has stored therein instructions, which, when executed by an electronic device with a display and a touch-sensitive surface, cause the device to: display, on the display, a first visual indicator; detect a first single touch input on the touch-sensitive surface at a location that corresponds to the first visual indicator; and, in response to detecting the first single touch input on the touch-sensitive surface at the location that corresponds to the first visual indicator, replace display of the first visual indicator with display of a first menu. The first menu includes a virtual touches selection icon. In response to detecting selection of the virtual touches selection icon, a menu of virtual multitouch contacts is displayed.

In accordance with some embodiments, a graphical user interface on an electronic device with a display, a touch-sensitive surface, a memory, and one or more processors to execute one or more programs stored in the memory includes a first visual indicator. A first single touch input is detected on the touch-sensitive surface at a location that corresponds to the first visual indicator. In response to detecting the first single touch input on the touch-sensitive surface at the location that corresponds to the first visual indicator, display of the first visual indicator is replaced with display of a first menu. The first menu includes a virtual touches selection icon. In response to detecting selection of the virtual touches selection icon, a menu of virtual multitouch contacts is displayed.

In accordance with some embodiments, a method is performed at an electronic device with a display and a touch-sensitive surface. The method includes displaying a menu of virtual multitouch contacts. The menu of virtual multitouch contacts includes a plurality of icons representing types of virtual multitouch contacts. The method also includes: detecting selection of a respective virtual multitouch contacts icon in the menu of virtual multitouch contacts by a single touch input; and, in response to detecting selection of the respective virtual multitouch contacts icon in the menu of virtual multitouch contacts by the single touch input, displaying one or more second visual indicators that correspond to the respective virtual multitouch contacts icon.

In accordance with some embodiments, a method is performed at an electronic device with a display and a touch-sensitive surface. The method includes: displaying a menu of virtual gestures, the menu of virtual gestures including a plurality of icons representing types of virtual gestures; detecting selection of a respective virtual gesture icon in the menu of virtual gestures by a single touch input; in response to detecting selection of the respective virtual gesture icon in the menu of virtual gestures by the single touch input, displaying a number of visual indicators that correspond to the respective virtual gesture icon; detecting a second single touch input; and, in response to detecting the second single touch input, performing an operation in accordance with the respective virtual gesture.

In accordance with some embodiments, a method is performed at an electronic device with a display and a touch-sensitive surface. The method includes: displaying a pinch/depinch gesture icon; detecting selection of the virtual pinch/depinch gesture icon by a single touch input; in response to detecting selection of the virtual pinch/depinch gesture icon by the single touch input, displaying two visual indicators that correspond to contacts in the virtual pinch/depinch gesture; detecting a second single touch input; and, in response to detecting the second single touch input, performing a zooming operation in accordance with the respective virtual pinch/depinch gesture.

In accordance with some embodiments, a method is performed at an electronic device with a display and a touch-sensitive surface. The method includes: displaying a virtual gestures icon; detecting selection of the virtual gestures icon by a single touch input; and, in response to detecting selection of the virtual gestures icon by the single touch input, displaying a menu of virtual gestures. The menu of virtual gestures includes a plurality of icons representing types of virtual gestures. The method also includes: detecting selection of a respective virtual gesture icon in the menu of virtual gestures by a second single touch input; and, in response to detecting selection of the respective virtual gesture icon in the menu of virtual gestures by the second single touch input, performing an action that corresponds to the respective virtual gesture.

In accordance with some embodiments, a method is performed at an electronic device with a display and a touch-sensitive surface. The method includes: displaying a virtual device icon; detecting selection of the virtual device icon by a single touch input; in response to detecting selection of the virtual device icon by the single touch input, displaying a menu of virtual device operations, the menu of virtual device operations including a plurality of icons representing types of virtual device operations; detecting selection of a respective virtual device operation icon in the menu of virtual device operations by a second single touch input; and, in response to detecting selection of the respective virtual device operation icon in the menu of virtual device operations by the second single touch input, performing an action that corresponds to the respective virtual device operation.

In accordance with some embodiments, a method is performed at an electronic device with a display and a touch-sensitive surface. The method includes: displaying a virtual device rotation icon; detecting selection of the virtual device rotation icon by a single touch input; and, in response to detecting selection of the virtual device rotation icon by the single touch input, displaying a menu of virtual device orientations. The menu of virtual device orientations includes a plurality of icons representing types of virtual device orientations. The method also includes: detecting selection of a respective virtual device orientation icon in the menu of virtual device orientations by a second single touch input; and, in response to detecting selection of the respective virtual device orientation icon in the menu of virtual device orientations by the second single touch input, orienting the display in accordance with the respective virtual device orientation.

In accordance with some embodiments, an electronic device includes a display, a touch-sensitive surface, one or more processors, memory, and one or more programs. The one or more programs are stored in the memory and configured to be executed by the one or more processors. The one or more programs include instructions for performing any of the methods described above.

In accordance with some embodiments, a computer readable storage medium has stored therein instructions, which, when executed by an electronic device with a display and a touch-sensitive surface, cause the device to perform any of the methods described above.

In accordance with some embodiments, a graphical user interface on an electronic device with a display, a touch-sensitive surface, a memory, and one or more processors to execute one or more programs stored in the memory includes a respective graphical user interface displayed while performing any of the methods described above.

Thus, electronic devices with touch-based user interfaces are provided with methods and interfaces that make these devices accessible to users that can perform inputs with only a single touch.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 6A-6D are flow diagrams illustrating a method of providing accessibility to a touch-based user interface configured to receive multitouch gestures using single touch inputs in accordance with some embodiments.

DESCRIPTION OF EMBODIMENTS

Figure 1A:
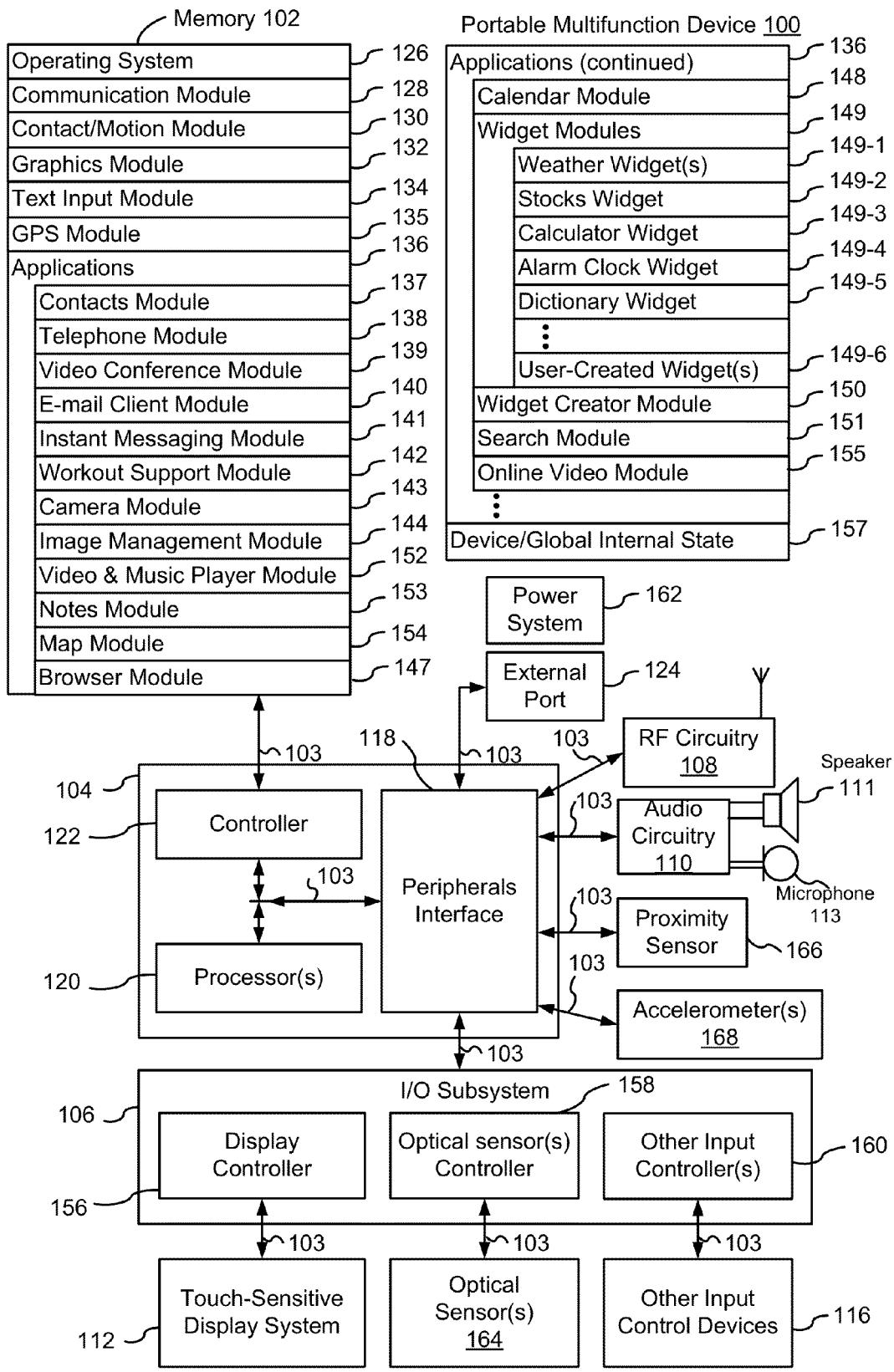
FIG. 1A is a block diagram illustrating a portable multifunction device with a touch-sensitive display in accordance with some embodiments.

Described below are devices and methods that enable users who cannot effectively operate multitouch-sensitive surfaces with two or more simultaneous contacts to nevertheless operate electronic devices with touch-based user interfaces configured to receive multitouch gestures. These devices and methods also enable such users to use single touch inputs to operate other hardware features that require manual dexterity (e.g., shaking or rotating the device or activating a physical button). The methods described herein include:

Using visual indicators to emulate multiple touches;
Using a menu of virtual multitouch contacts in conjunction with a single touch input on a touch-sensitive surface to select the type of multitouch contact being emulated;
Using a menu of virtual gestures in conjunction with a single touch input on a touch-sensitive surface to select and emulate multitouch gestures on the touch-sensitive surface;
Using two visual indicators (which correspond to two virtual touches) in conjunction with a single touch input on a touch-sensitive surface to emulate pinch/depinch gestures on the touch-sensitive surface;
Using a menu of virtual device operations in conjunction with a single touch input on a touch-sensitive surface to select and emulate operations that are normally performed via activation of physical controls on the electronic device (e.g., mute switches, lock switches, volume buttons) or in response to activity detected by an accelerometer (e.g., device shaking or device rotation); and
Using a menu of virtual device orientations in conjunction with a single touch input on a touch-sensitive surface to control the display orientation.

These methods make operations that are designed for users interacting with touch-sensitive surfaces via multitouch gestures accessible to users who can, or prefer to, just provide single touch inputs.

Below, FIGS. 1A-1B, 2, and 3 provide a description of exemplary devices. FIGS. 4A-4B and 5A-5V illustrate exemplary user interfaces for providing accessibility to a touch-based user interface. FIGS. 6A-6D and 7-12 are flow diagrams illustrating methods of providing accessibility to a touch-based user interface. The user interfaces in FIGS. 5A-5V are used to illustrate the processes in FIGS. 6A-6D and 7-12.

Exemplary Devices

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more non-transitory computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1A may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 may also include one or more accelerometers 168. FIG. 1A shows accelerometer 168 coupled to peripherals interface 118. Alternately, accelerometer 168 may be coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
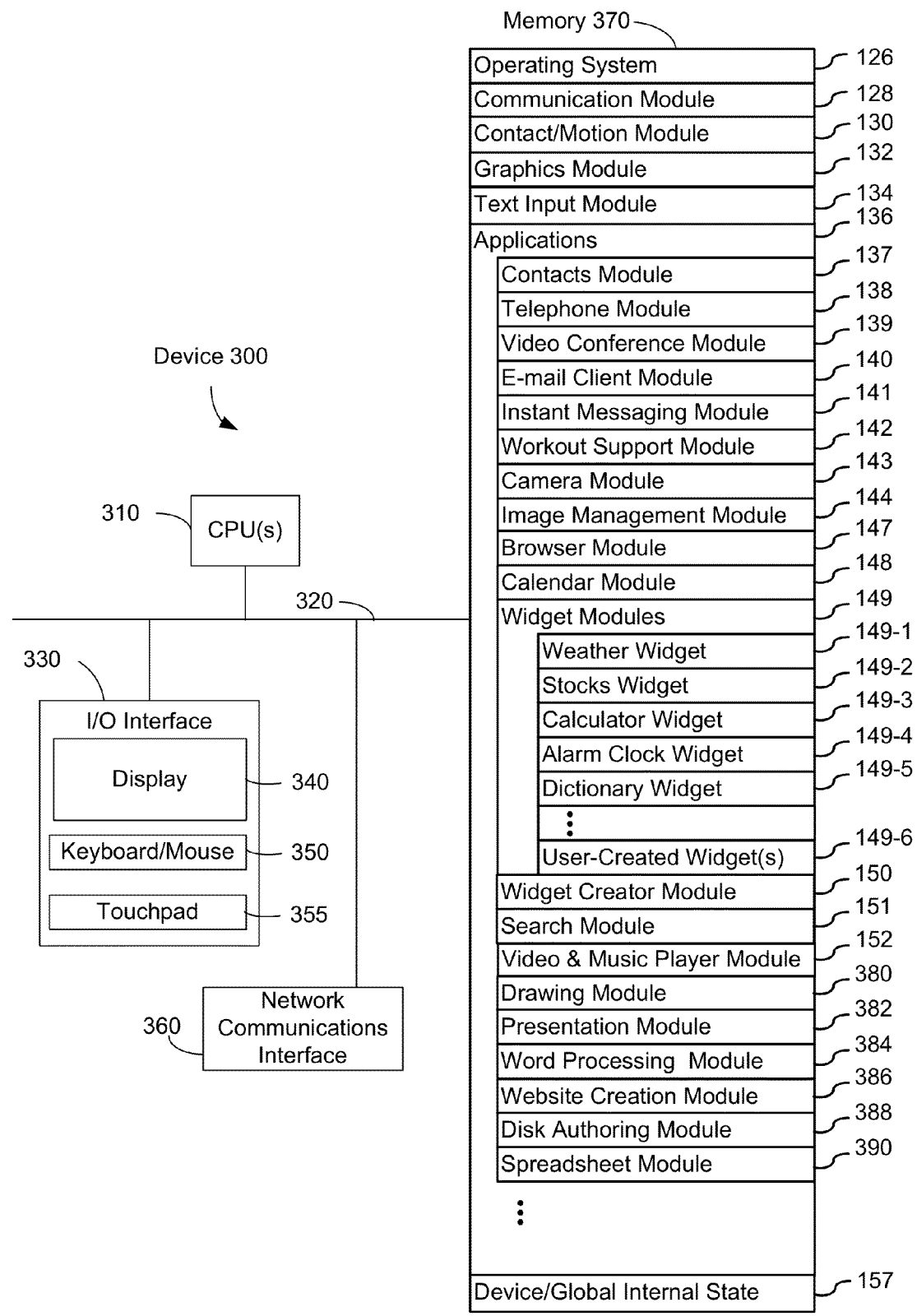
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
contacts module 137 (sometimes called an address book or contact list);
telephone module 138;
video conferencing module 139;
e-mail client module 140;
instant messaging (IM) module 141;
workout support module 142;
camera module 143 for still and/or video images;
image management module 144;
browser module 147;
calendar module 148;
widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which may be made up of a video player module and a music player module;
notes module 153;
map module 154; and/or
online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1B:
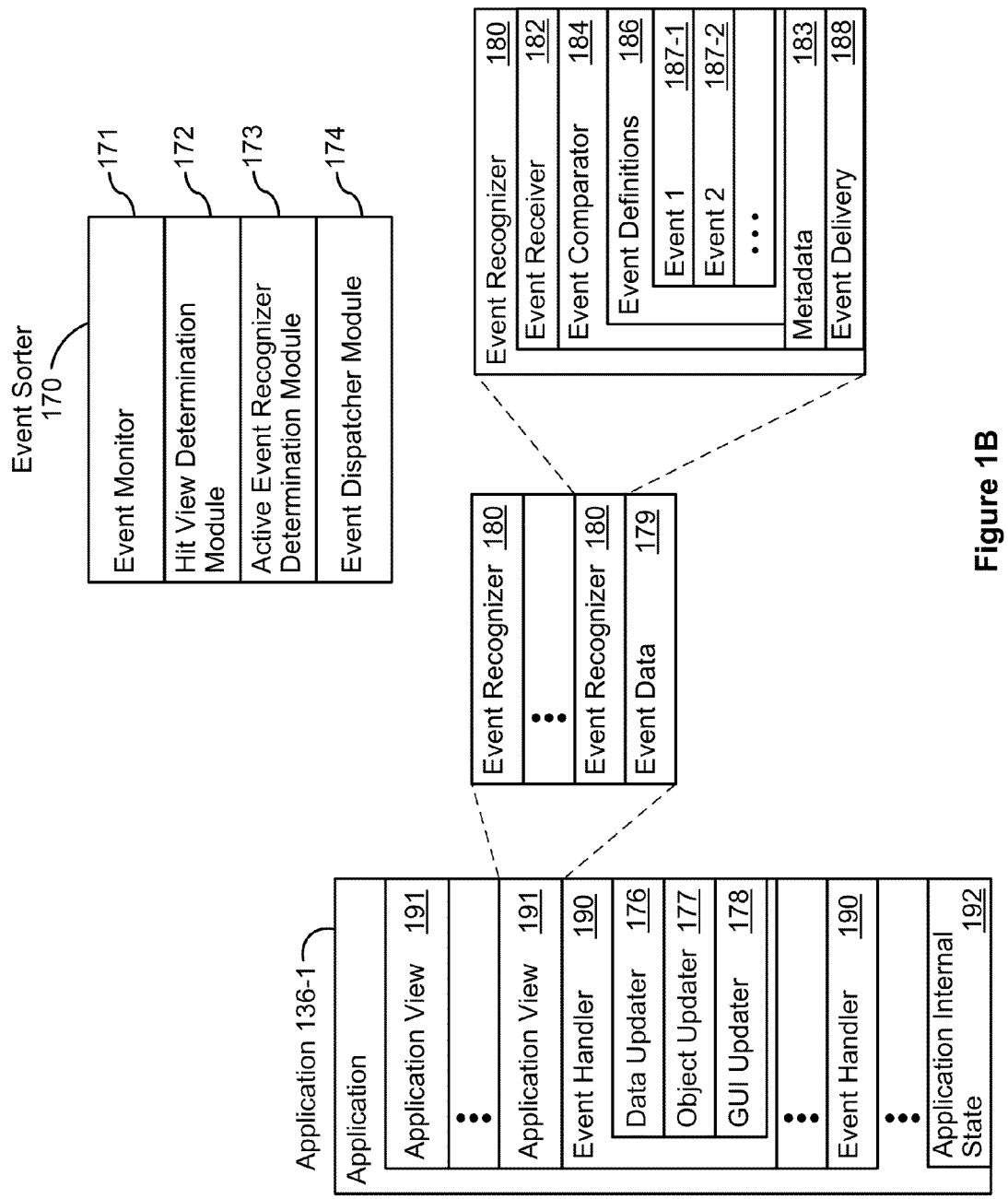
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multitouch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating joystick or mouse movement and button presses, single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
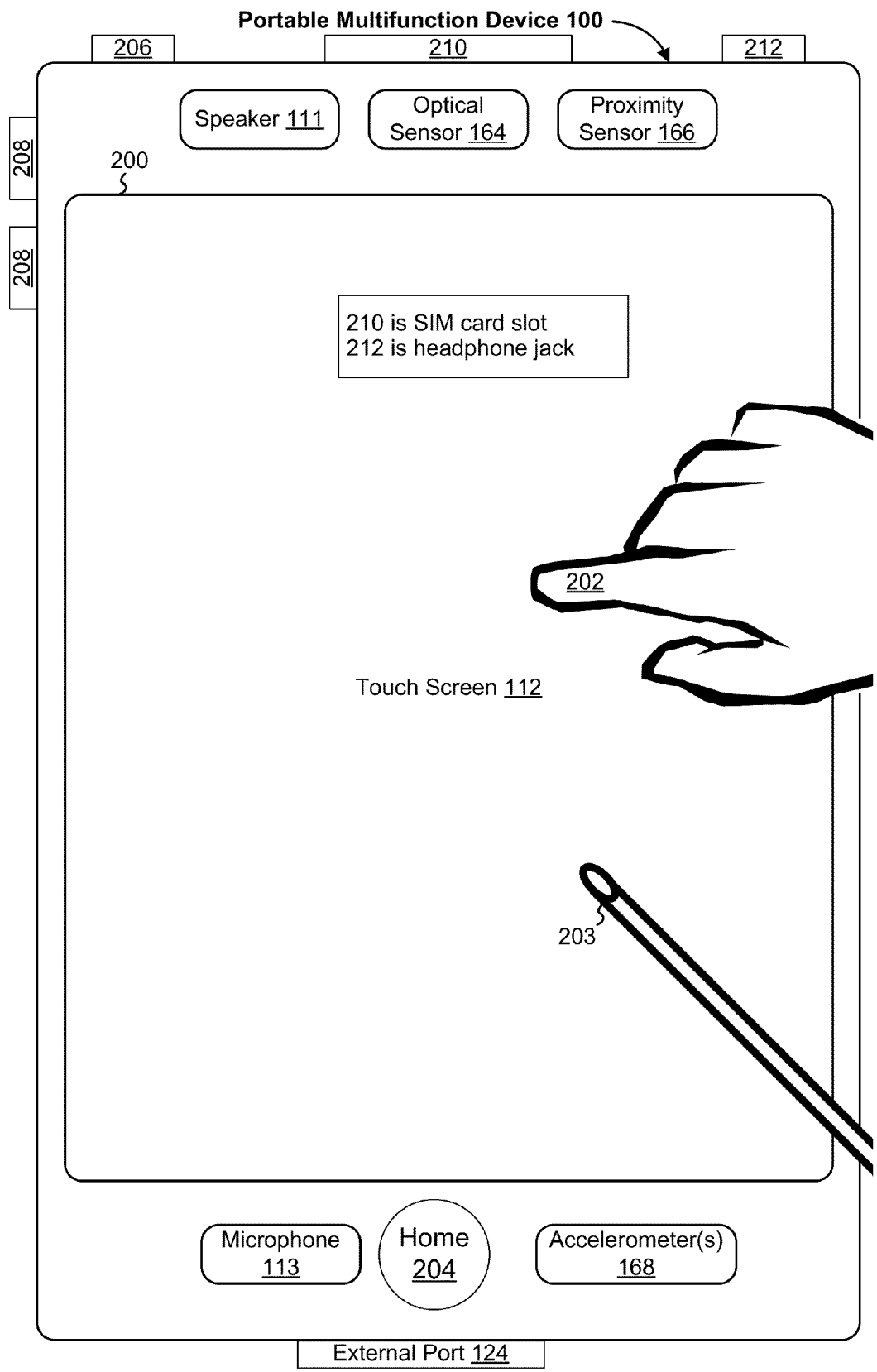
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture may include one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
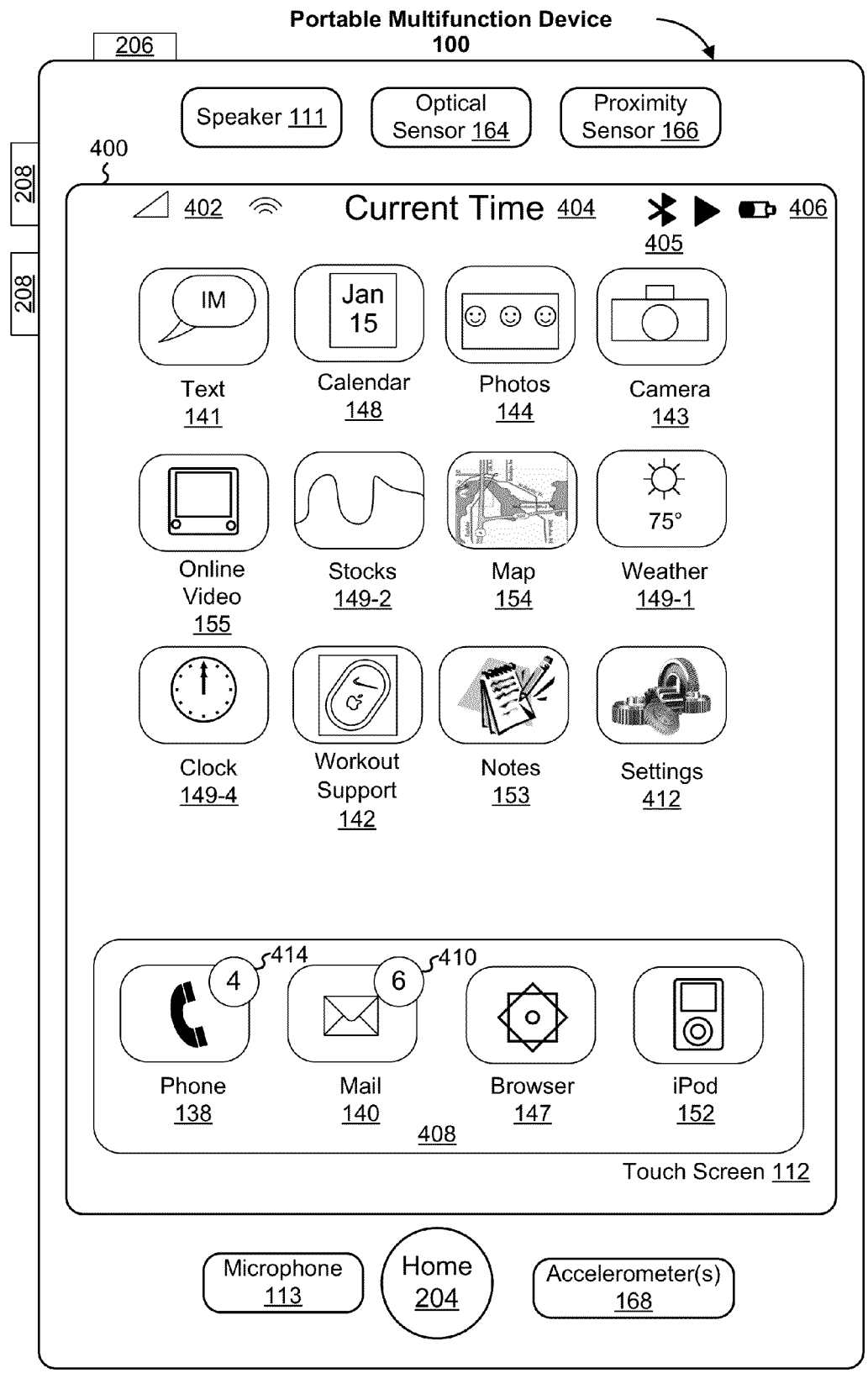
FIG. 4A illustrates an exemplary user interface for a menu of applications on a portable multifunction device in accordance with some embodiments.
Figure 5A:
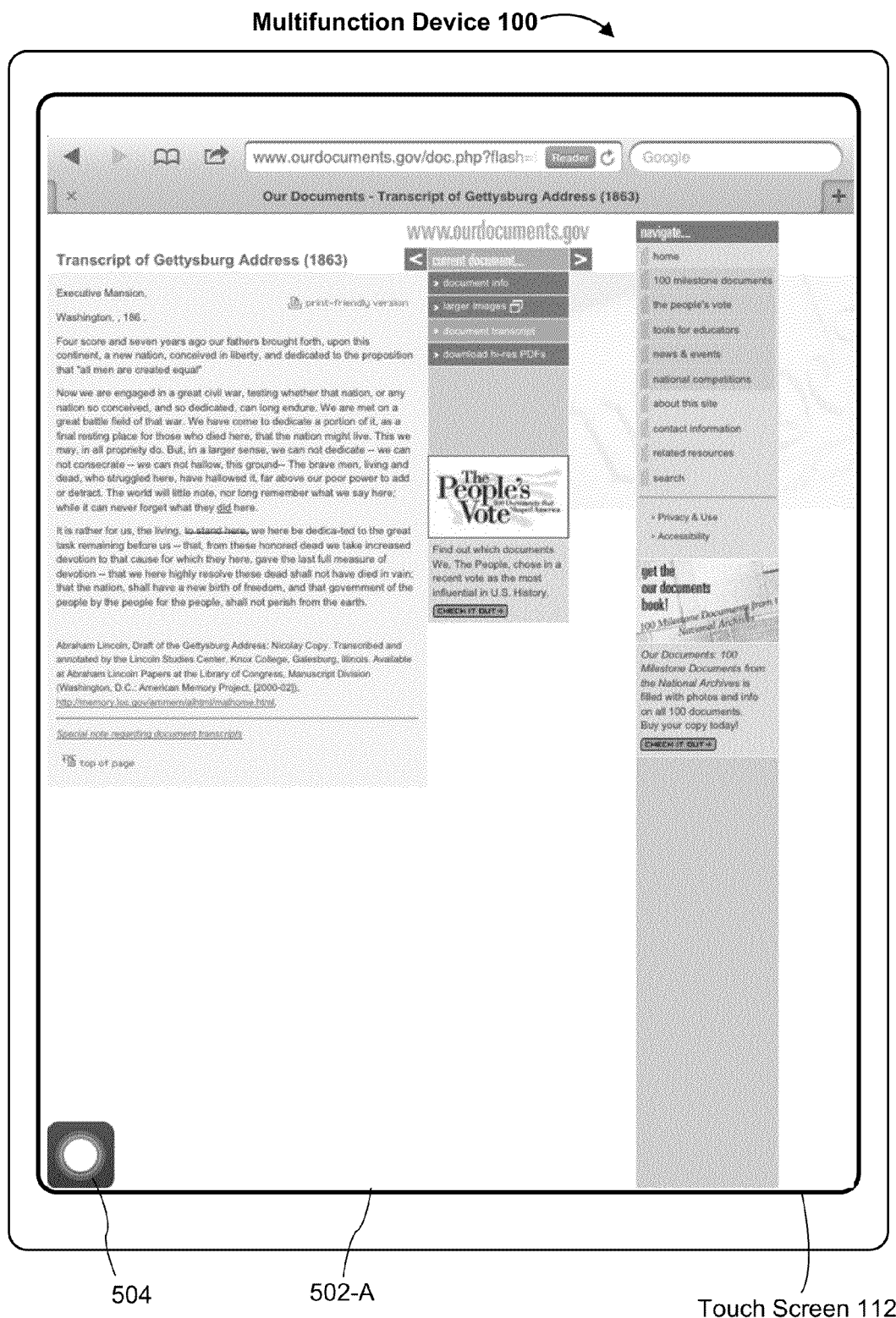
FIGS. 5A-5V illustrate exemplary user interfaces for providing accessibility to a touch-based user interface configured to receive multitouch gestures using single touch inputs in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Video and music player 152, also referred to as iPod (trademark of Apple Inc.) module 152; and Icons for other applications, such as:
  IM 141;
  Image management 144;
  Camera 143;
  Weather 149-1;
  Stocks 149-2;
  Workout support 142;
  Calendar 148;
  Alarm clock 149-4;
  Map 154;
  Notes 153;
  Settings 412, which provides access to settings for device 100 and its various applications 136; and
  Online video module 155, also referred to as YouTube (trademark of Google Inc.) module 155.

Figure 4B:
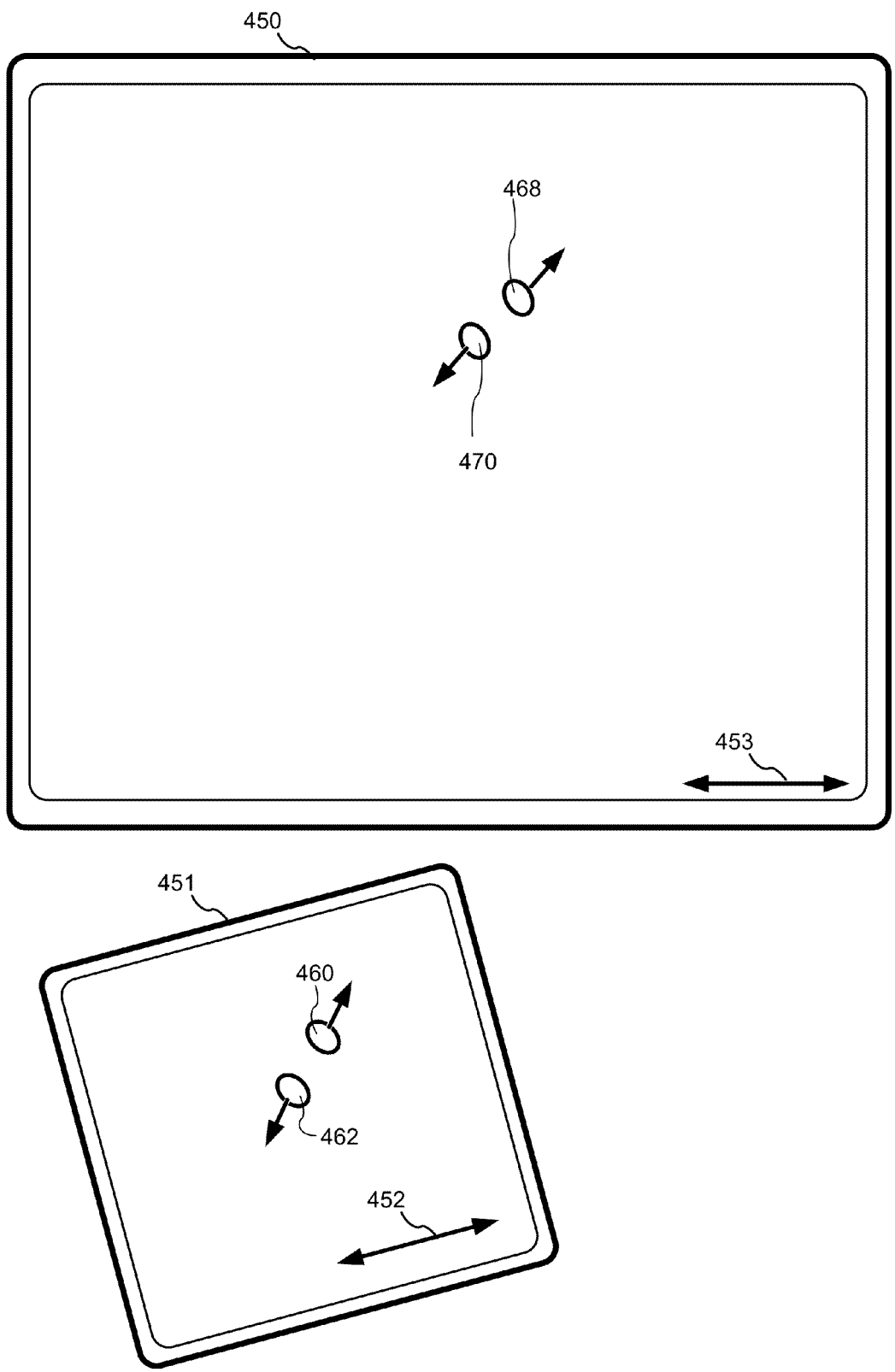
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods may be used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a stylus input).

User Interfaces and Associated Processes

Attention is now directed towards embodiments of user interfaces ("UI") and associated processes that may be implemented on an electronic device with a display and a touch-sensitive surface, such as device 300 or portable multifunction device 100.

FIGS. 5A-5V illustrate exemplary user interfaces for providing accessibility to a touch-based user interface configured to receive multitouch gestures using single touch inputs in accordance with some embodiments. The user interfaces in these figures are used to illustrate the processes described below, including the processes in FIGS. 6A-6D and 7-12.

FIG. 5A illustrates exemplary user interface 502-A of a web browser application displayed on touch screen 112 of multifunction electronic device 100. User interface 502-A includes display of a web page. Also shown in FIG. 5A is visual indicator 504. Visual indicator 504 in FIG. 5A is depicted as including a circle. Alternatively, visual indicator 504 may include one of: a donut, ring, oval, ellipse, arrow, cross, I-beam, star, virtual finger (e.g., a finger or hand shaped icon), and any combination thereof.

Figure 5B:
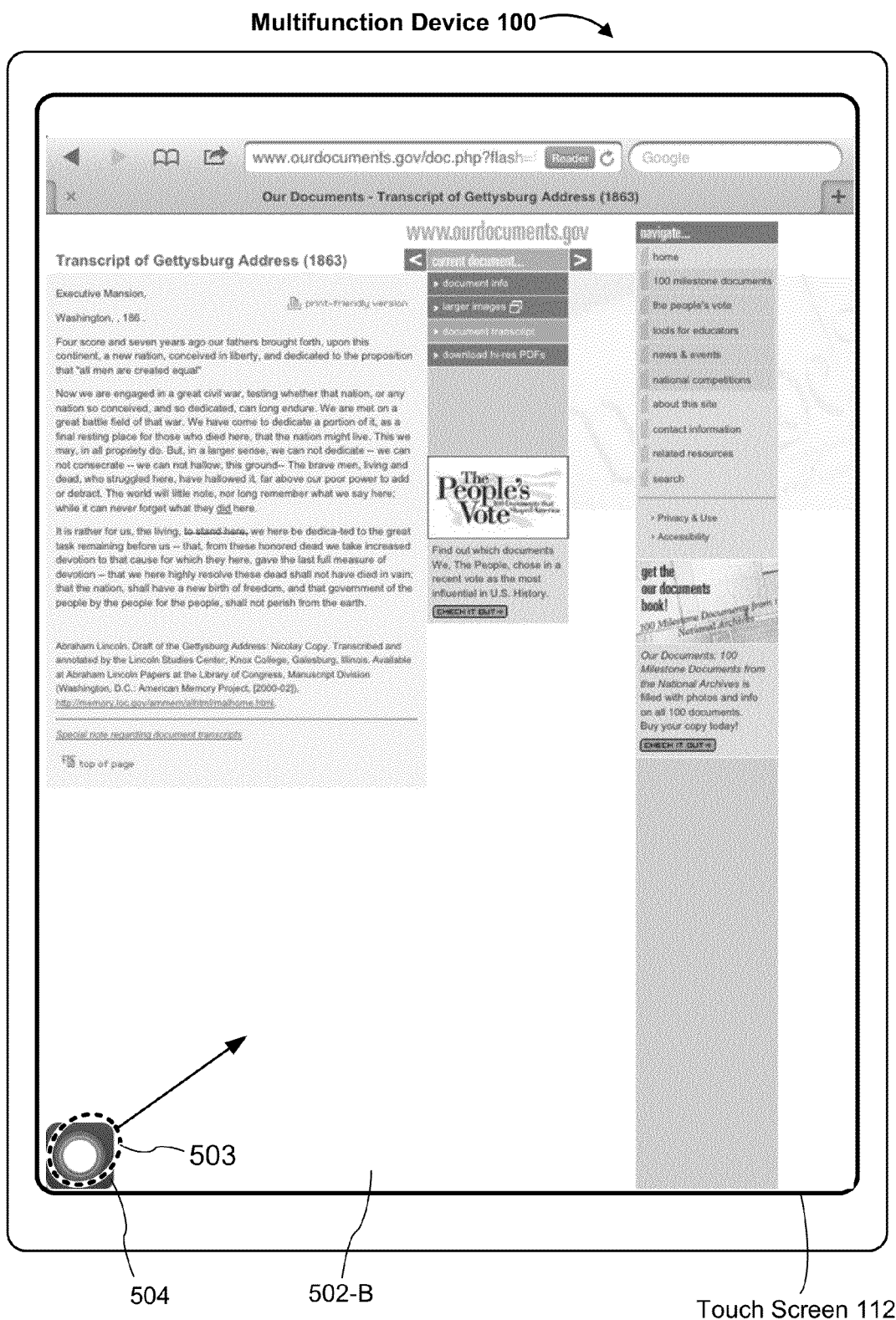
Figure 5C:
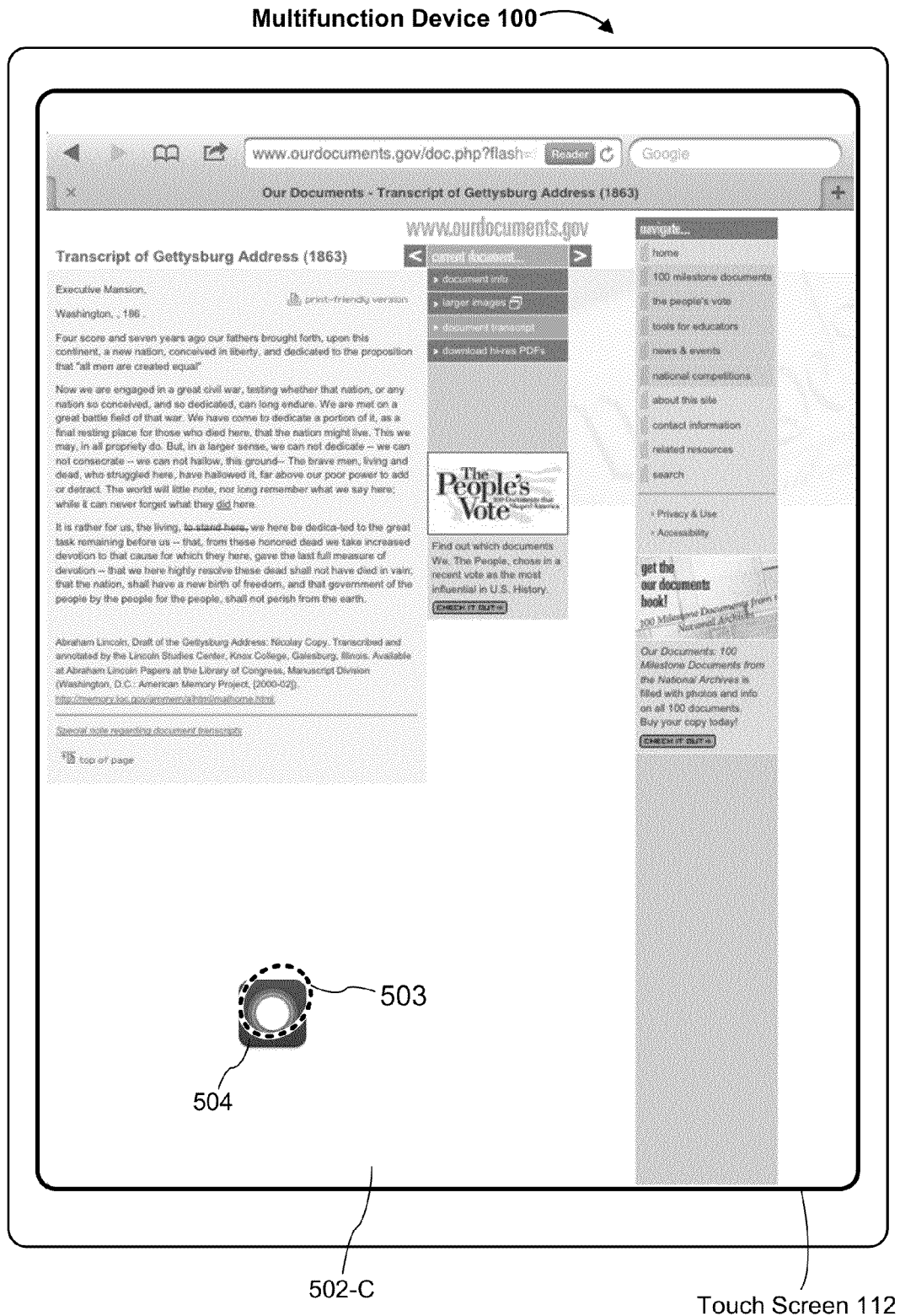

Visual indicator 504 is configured to move in accordance with a touch gesture by a single touch on touch screen 112. For example, FIGS. 5B and 5C illustrate that, in some embodiments, visual indictor 504 moves in accordance with touch gesture 503. In user interface 502-B of FIG. 5B, touch gesture 503 (e.g., a tap-and-hold gesture) is detected at a location that corresponds to visual indicator 504. FIG. 5B also illustrates that a single finger contact of touch gesture 503 moves across touch screen 112. As a result of the movement of the single finger contact of touch gesture 503 on touch screen 112, visual indicator 504 moves in accordance with the movement of the single finger contact of touch gesture 503, as shown in user interface 502-C of FIG. 5C. Instead of the tap-hold-and-move gesture illustrated in FIGS. 5B and 5C, other gestures may be used. For example, a swipe gesture or dragging gesture may be detected at a location that corresponds to visual indicator 504, and visual indicator 504 may move in accordance with the swipe gesture or dragging gesture.

Figure 5D:
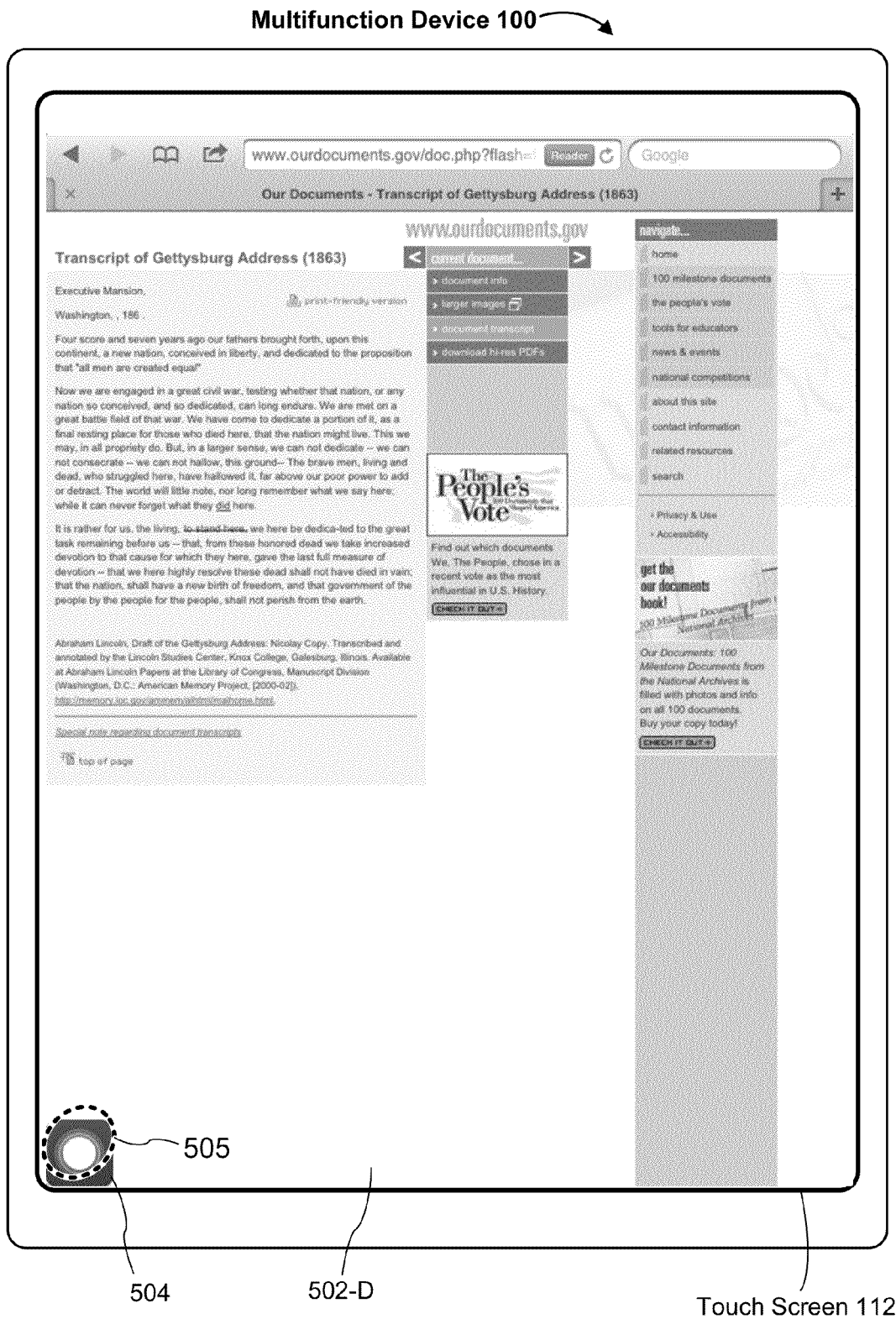

As illustrated in user interface 502-D of FIG. 5D, in some embodiments, once touch gesture 503 is terminated (e.g., the single touch contact of touch gesture 503 is no longer detected on touch screen 112, FIG. 5D), visual indicator 504 moves to a location at a periphery of touch screen 112.

FIG. 5D also illustrates that touch gesture 505 (e.g., a tap gesture) is detected at a location that corresponds to visual indicator 504.

Figure 5E:
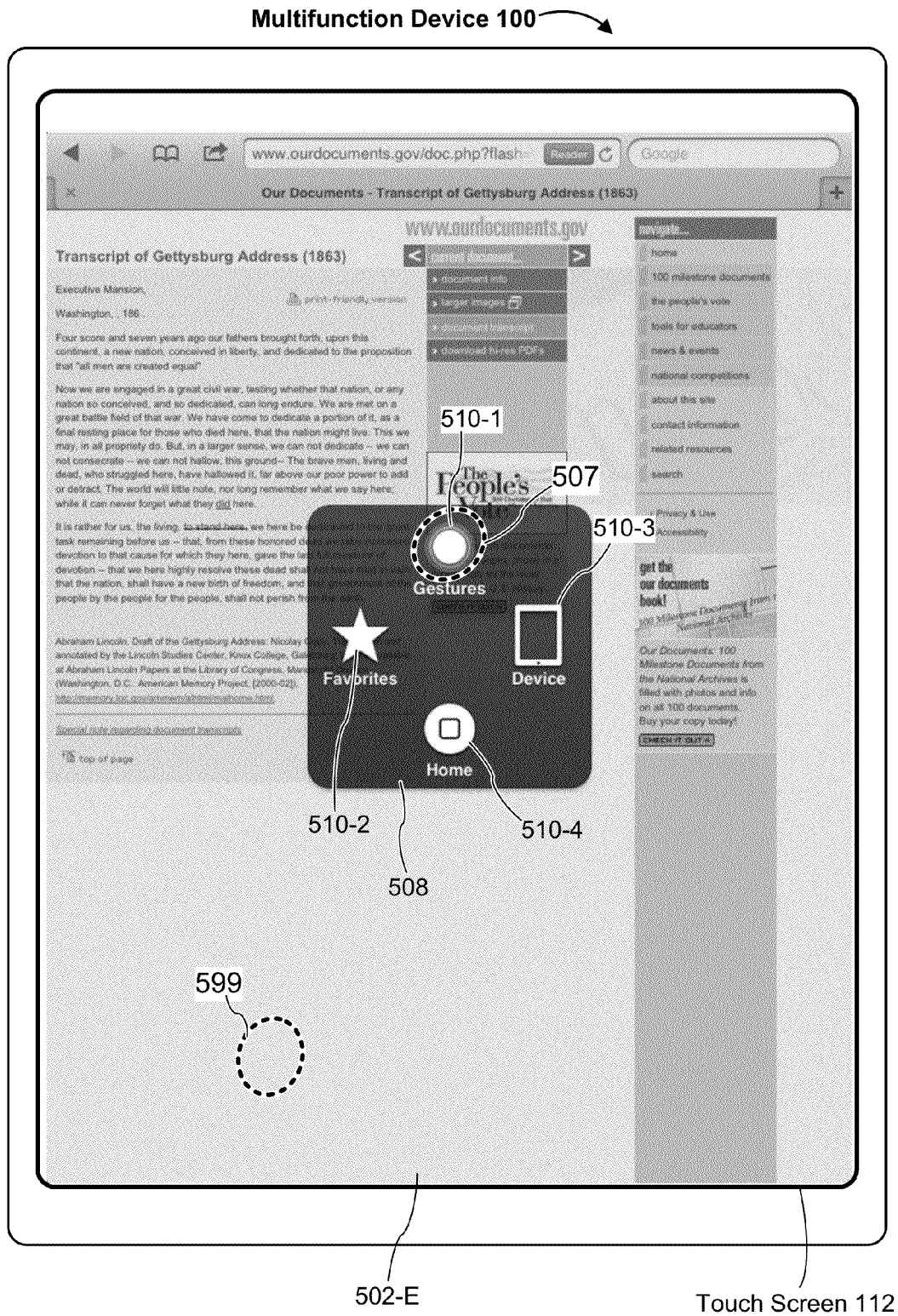

FIG. 5E illustrates user interface 502-E, where, in response to detecting touch gesture 505 (FIG. 5D) at the location that corresponds to visual indicator 504, visual indicator 504 (FIG. 5D) ceases to be displayed on touch screen 112 and menu 508 is displayed on touch screen 112. As illustrated in FIG. 5E, in some embodiments, menu 508 is displayed over the web browser user interface. In some embodiments, menu 508 is displayed in a center region of touch screen display 112. Menu 508 includes icons 510-1, 510-2, 510-3, and 510-4 displayed radially about a center of menu 508.

FIG. 5E shows touch gesture 599 (e.g., a tap gesture) at a location that does not correspond to menu 508. In some embodiments, in response to detecting a touch gesture (e.g., touch gesture 599) at a location that does not correspond to menu 508, display of menu 508 is replaced with display of visual indicator 504 (e.g., FIG. 5D).

Alternatively, touch gesture 507 (e.g., a tap gesture) is detected at a location that corresponds to icon 510-1 in menu 508 as illustrated in FIG. 5E, thereby selecting icon 510-1 in menu 508. In some embodiments, icon 510-1 is called a virtual touches selection icon.

Figure 5F:
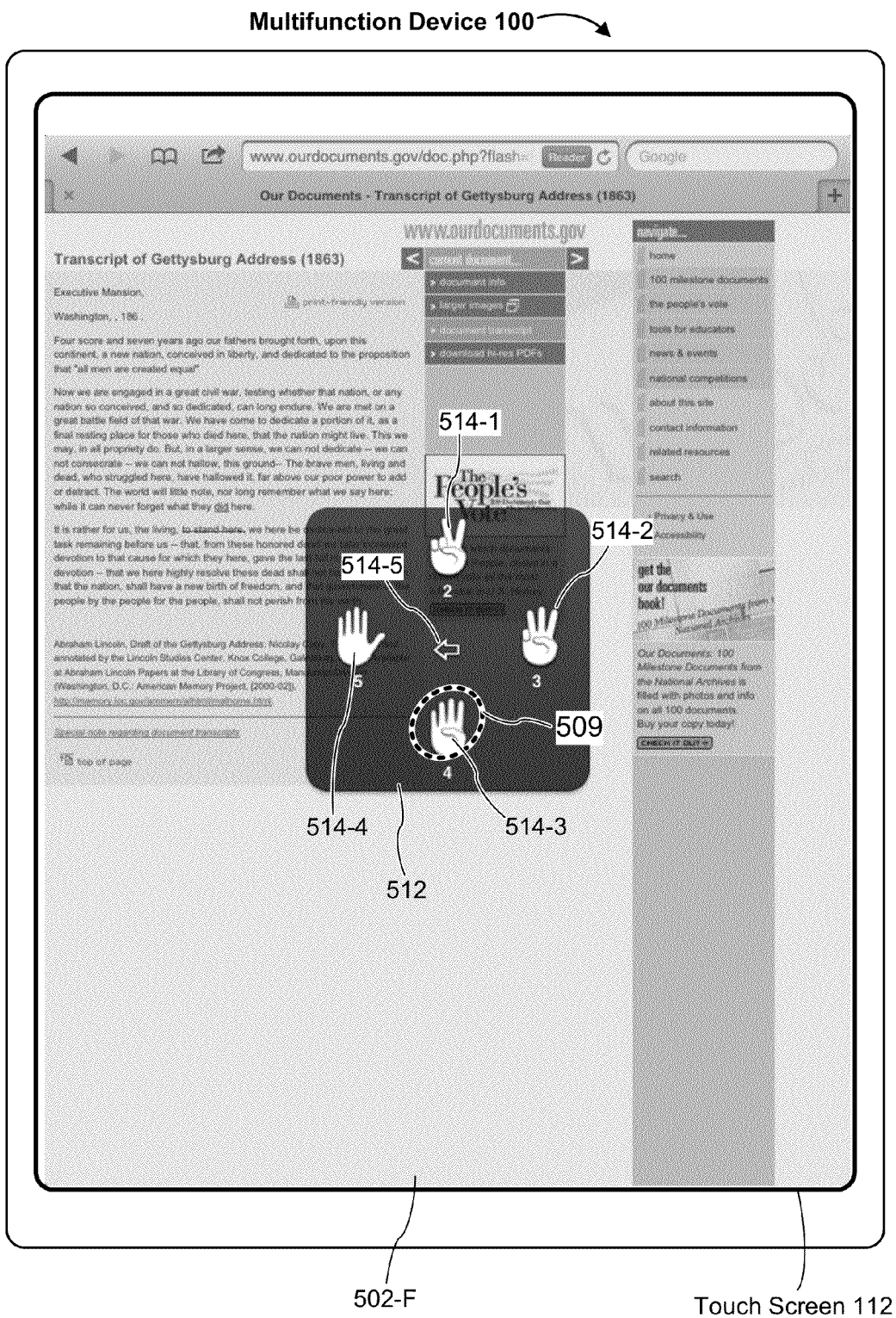

FIG. 5F illustrates user interface 502-F, where, in response to detecting selection of icon 510-1 (e.g., the virtual touches selection icon labeled "Gestures"), menu 512 is displayed on touch screen 112. In some embodiments, menu 512 is called a menu of virtual multitouch contacts. In FIG. 5F, menu 512 includes a plurality of icons representing types of virtual multitouch contacts (e.g., two-finger contacts icon 514-1, three-finger contacts icon 514-2, four-finger contacts icon 514-3, five-finger contacts icon 514-4, etc.). In FIG. 5F, touch gesture 509 (e.g., a tap gesture) is detected at a location that corresponds to icon 514-3, thereby selecting icon 514-3.

Menu 512 shown in FIG. 5F also includes back icon 514-5, which, when selected by a single touch input, initiates display of menu 508 shown in FIG. 5E. Similarly, back icons in menu 516 (FIG. 5K), menu 522 (FIG. 5R), and menu 526 (FIG. 5S), when selected by a single touch input, each initiate display of menu 508 shown in FIG. 5E.

Figure 5G:
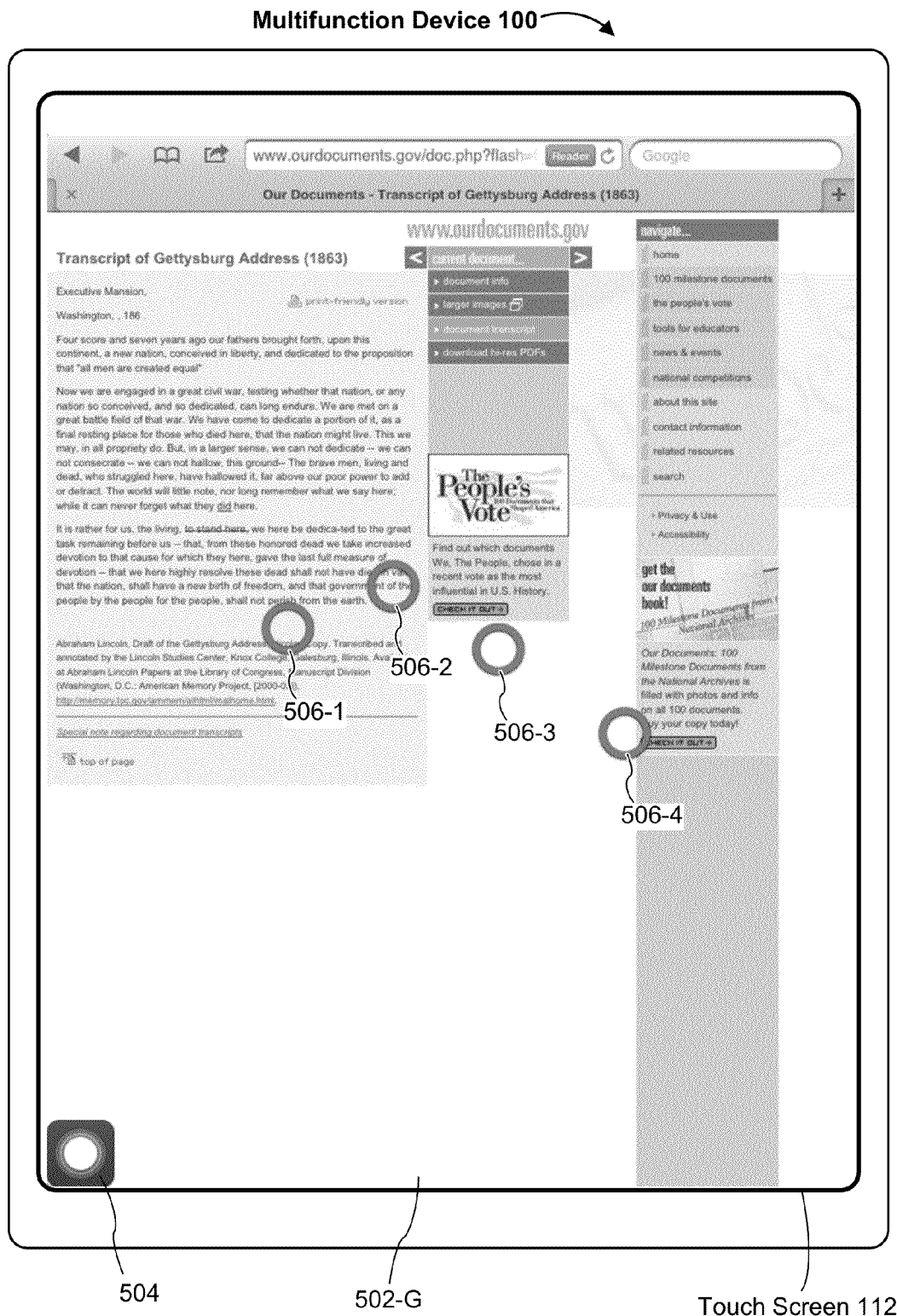

FIG. 5G illustrates user interface 502-G, where, in response to detecting touch gesture 509 on icon 514-3, four visual indicators 506-1, 506-2, 506-3, and 506-4 are displayed on touch screen 112. In some embodiments, when one or more visual indicators (e.g., visual indicators 506-1 through 506-4) are displayed on touch screen 112, menu 512 (FIG. 5F) ceases to be displayed on touch screen 112. In some embodiments, when one or more visual indicators (e.g., visual indicators 506-1 through 506-4) are displayed on touch screen 112, menu 512 is replaced with visual indicator 504 (e.g., as shown in FIG. 5G).

Figure 5H:
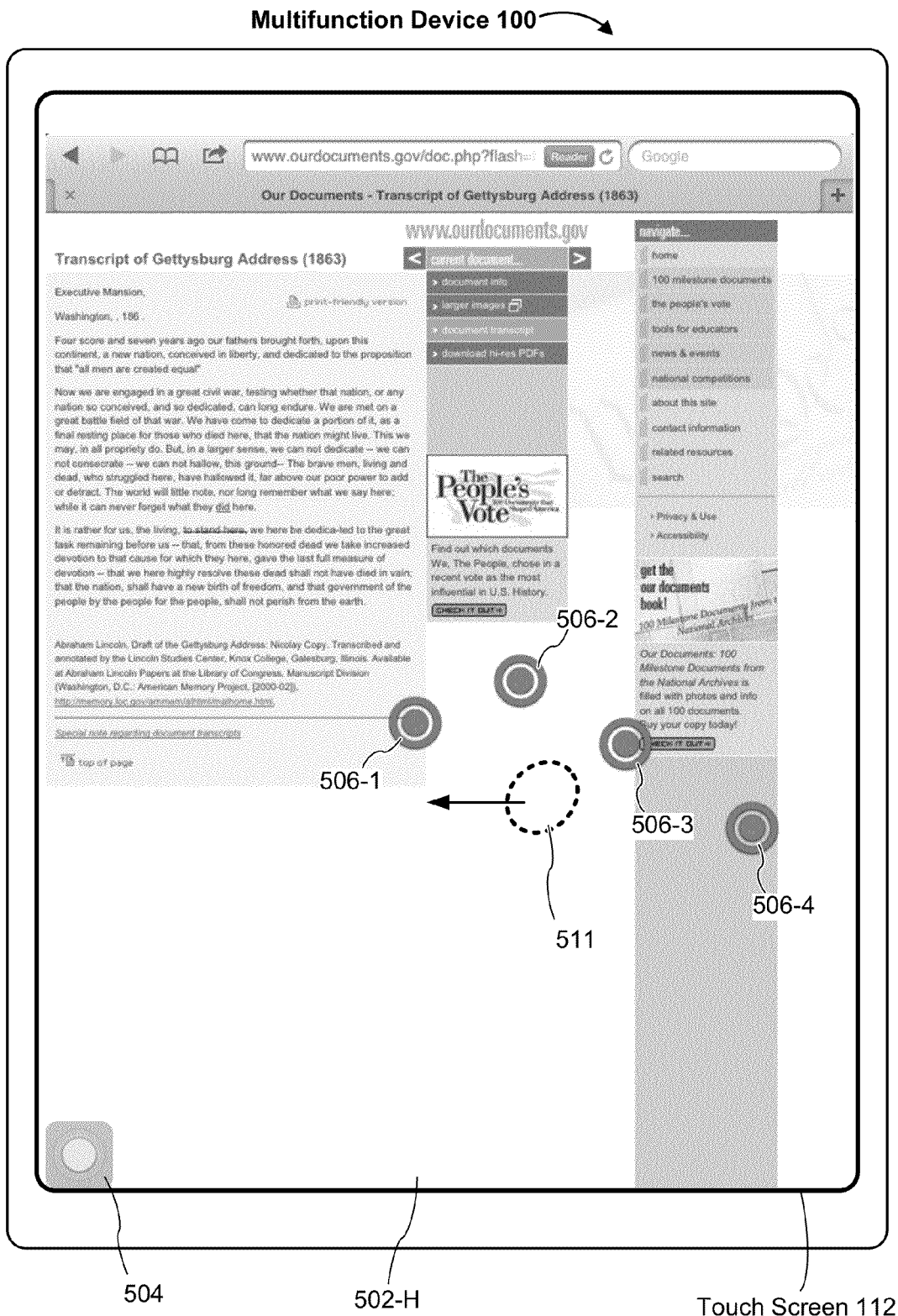

FIG. 5H illustrates user interface 502-H and single-touch gesture 511 on touch screen 112. In response to detecting single-touch gesture 511 on touch screen 112, four visual indicators 506-1, 506-2, 506-3, and 506-4 are moved to respective locations based on the location of single-touch gesture 511 (e.g., the centroid of the four visual indicators 506-1, 506-2, 506-3, and 506-4 is made to correspond to the location of single-touch gesture 511). FIG. 5H also illustrates that single-touch gesture 511 moves across touch screen 112. In response to detecting the movement of single-touch gesture 511 across touch screen 112, the four visual indicators 506-1, 506-2, 506-3, and 506-4 move in accordance with the movement of single-touch gesture 511 (e.g., visual indicators 506-1, 506-2, 506-3, and 506-4 move in the direction of movement of single-touch gesture 511 at the same speed as single-touch gesture 511). In some embodiments, single-touch gesture 511, when four visual indicators 506-1 through 506-4 are displayed, corresponds to a four-finger swipe-left gesture. In some embodiments, a four-finger swipe-left gesture on touch screen 112 is configured to initiate displaying a user interface of another distinct application (e.g., the user interface of an application that was displayed prior to displaying the user interface of the web browser application, such as a settings application, email application, etc.). Thus, single-touch gesture 511 also initiates displaying a user interface of another distinct application.

Figure 5I:
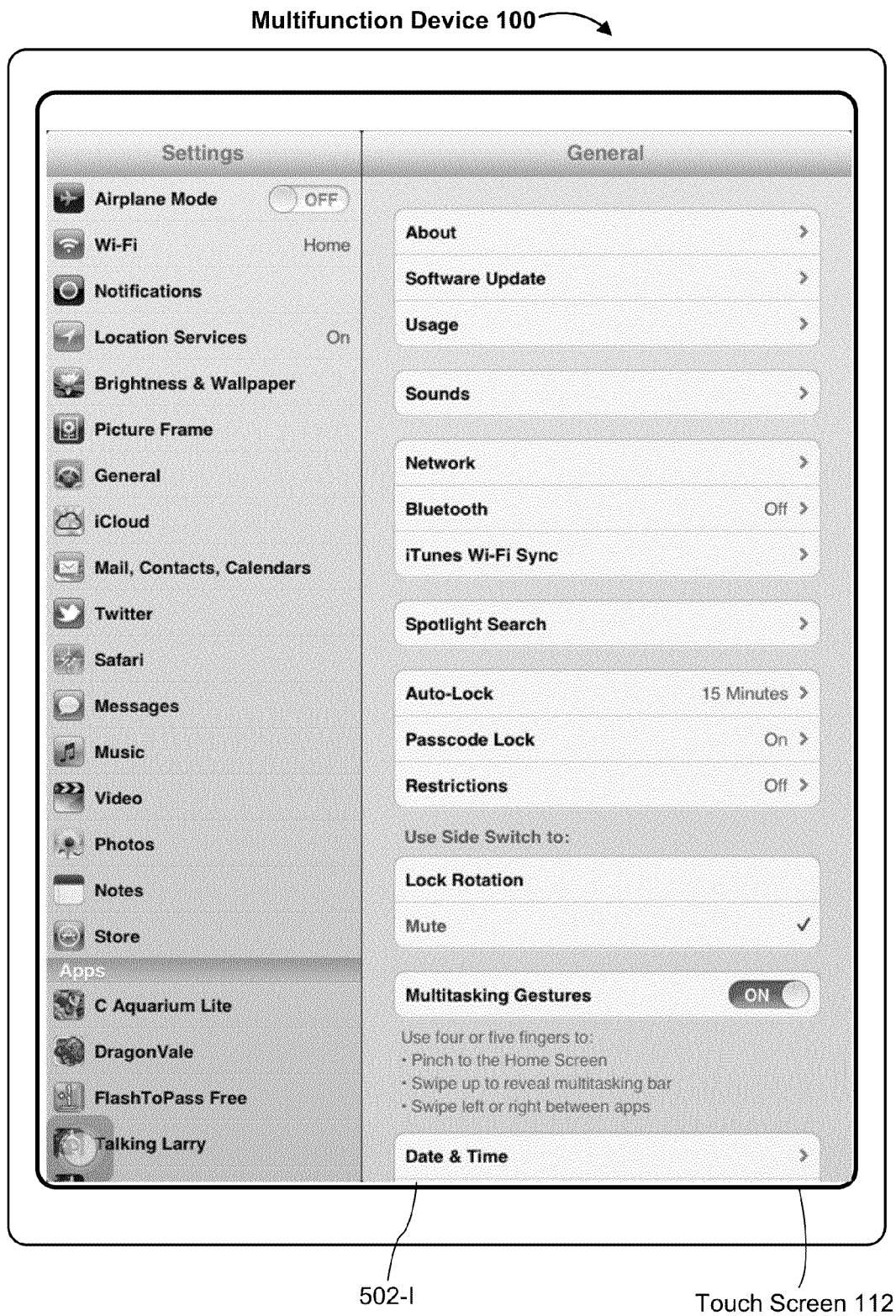

FIG. 5I illustrates that, in response to detecting single-touch gesture 511 (e.g., simulating a four-finger swipe-left gesture) on touch screen 112, user interface 502-I of the settings application is displayed on touch screen 112 in place of the browser application.

Figure 5J:
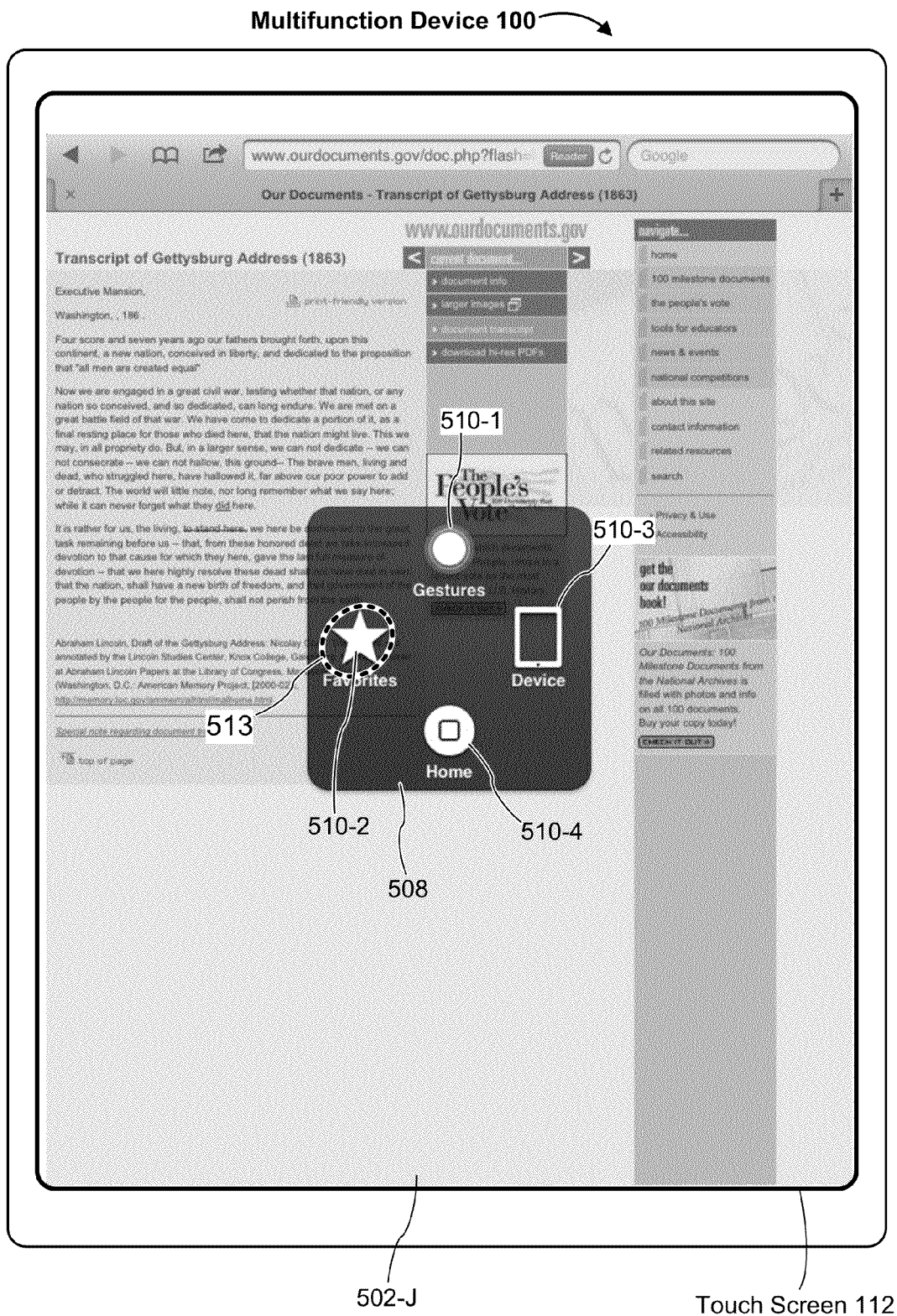

FIG. 5J illustrates user interface 502-J, where touch gesture 513 (e.g., a tap gesture) is detected at a location that corresponds to icon 510-2 of menu 508, thereby selecting icon 510-2 in menu 508. In some embodiments, icon 510-2 is called a virtual gestures icon.

Figure 5K:
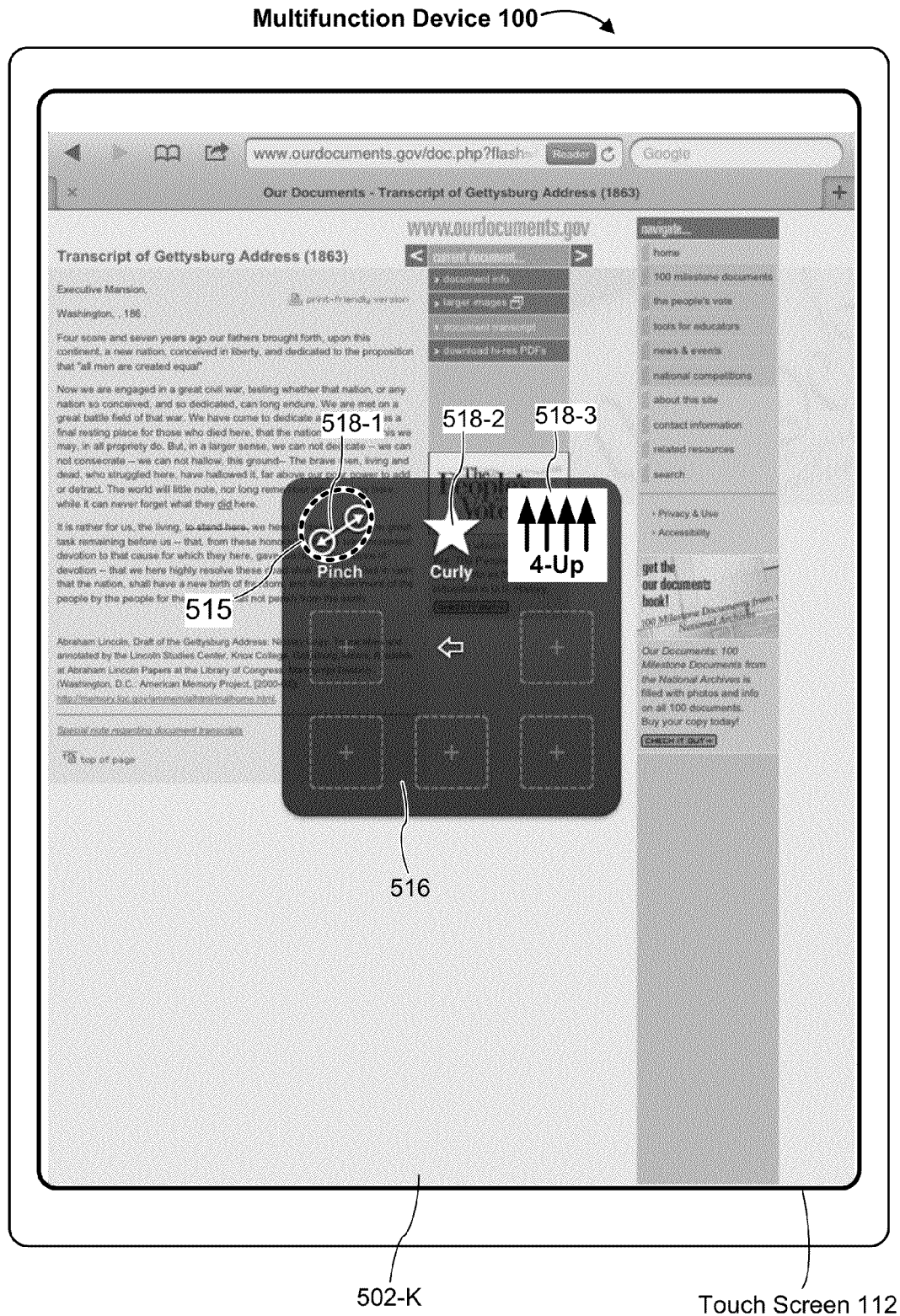

FIG. 5K illustrates user interface 502-K, where, in response to detecting selection of icon 510-2 (e.g., the virtual gestures icon labeled "Favorites" in FIG. 5J), menu 516 is displayed on touch screen 112. In some embodiments, menu 516 is called a menu of virtual gestures. In FIG. 5K, menu 516 includes a plurality of icons representing types of virtual gestures (e.g., pinch/depinch gesture 518-1, curly gesture 518-2, four-finger swipe-up gesture 518-3, etc.). In FIG. 5K, touch gesture 515 (e.g., a tap gesture) is detected at a location that corresponds to icon 518-1, thereby selecting pinch/depinch icon 518-1.

Figure 5L:
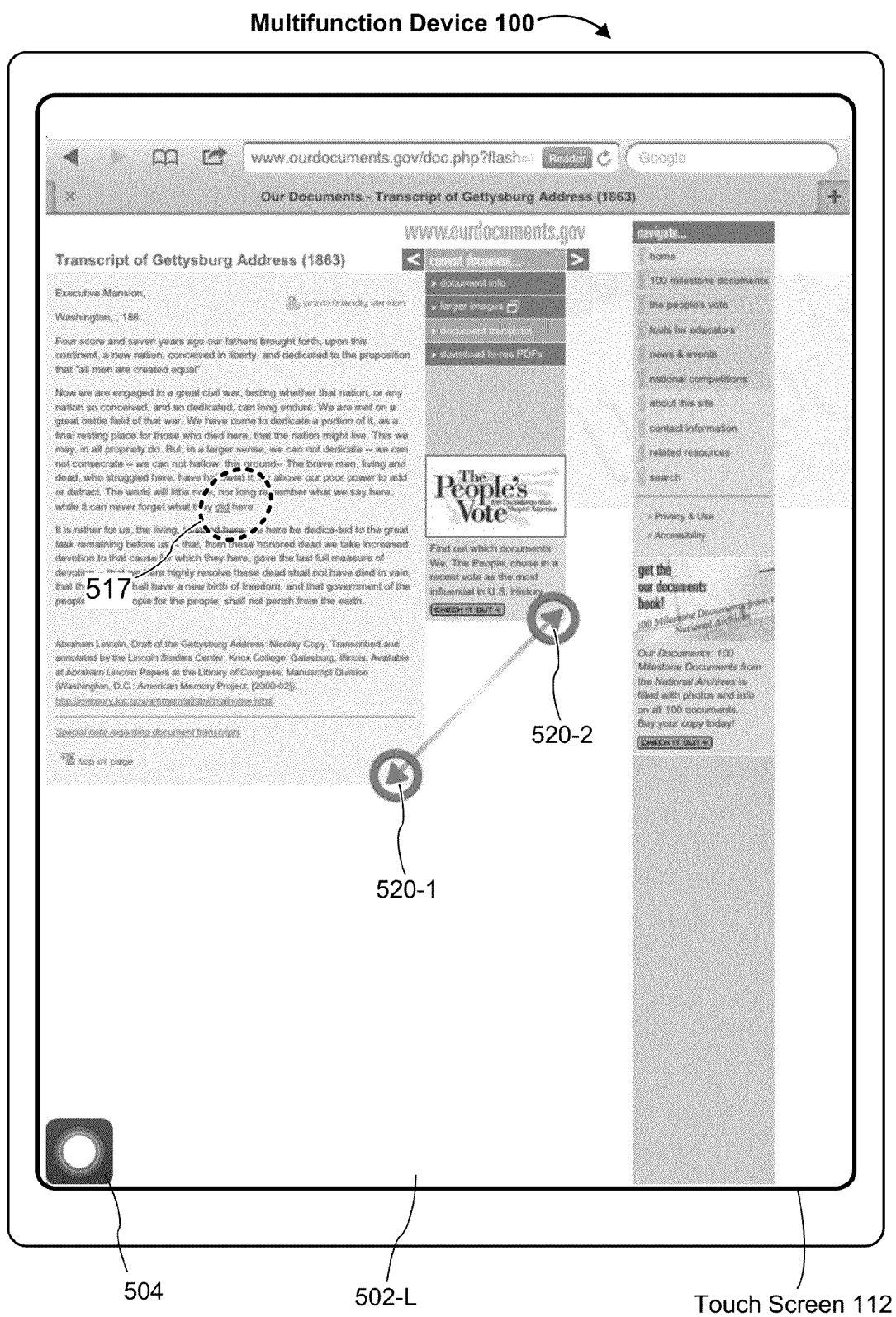

User interface 502-L shown in FIG. 5L includes the user interface of the web browser application and two visual indicators 520-1 and 520-2 corresponding to pinch/depinch icon 518-1. Pinch/depinch icon 518-1 has two corresponding visual indicators 520-1 and 520-2, because a pinch/depinch gesture typically requires two finger contacts (e.g., a thumb and an index finger) on touch screen 112. FIG. 5L also illustrates finger gesture 517 (e.g., a tap gesture) on touch screen 112.

Figure 5M:
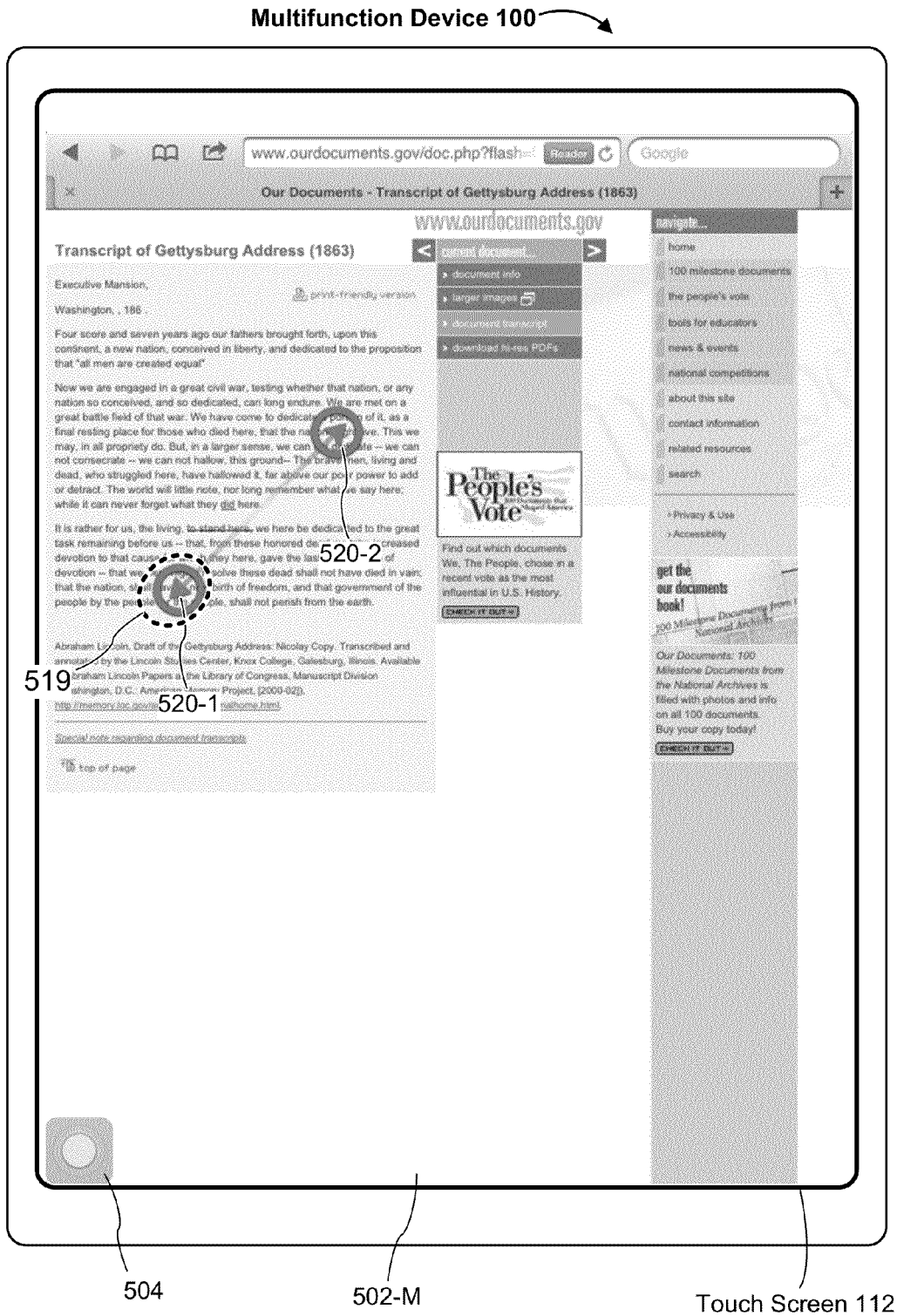

In some embodiments, in response to single finger gesture 517 on touch screen 112, visual indicators 520-1 and 520-2 are moved to a location that corresponds to the location of single finger gesture 517 (FIG. 5L), as shown in user interface 502-M of FIG. 5M.

FIG. 5M also illustrates that single finger gesture 519 is detected at a location that corresponds to one of the displayed visual indicators (e.g., visual indicator 520-1).

Figure 5N:
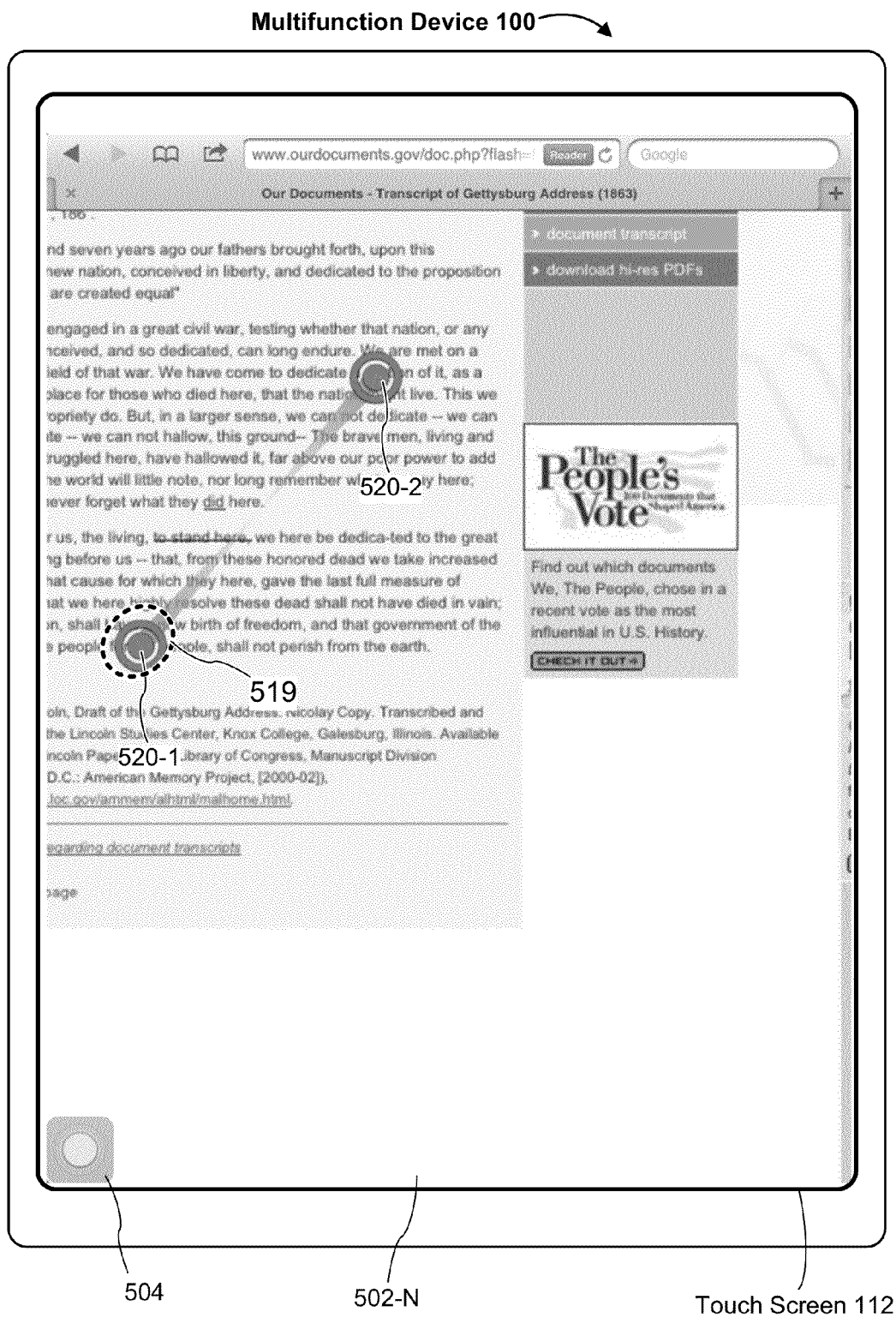

User interface 502-N of FIG. 5N illustrates that single finger gesture 519 moves across touch screen 112, and visual indicators 520-1 and 520-2 move in accordance with the movement of single finger gesture 519 (e.g., in FIG. 5N, visual indicators 520-1 and 520-2 move apart from each other). FIG. 5N also illustrates that the web page displayed on touch screen 112 is zoomed in, in accordance with the movement of single finger gesture 519, as if in response to actual two finger contacts in a depinch gesture moving apart from each other on touch screen 112.

Figure 5O:
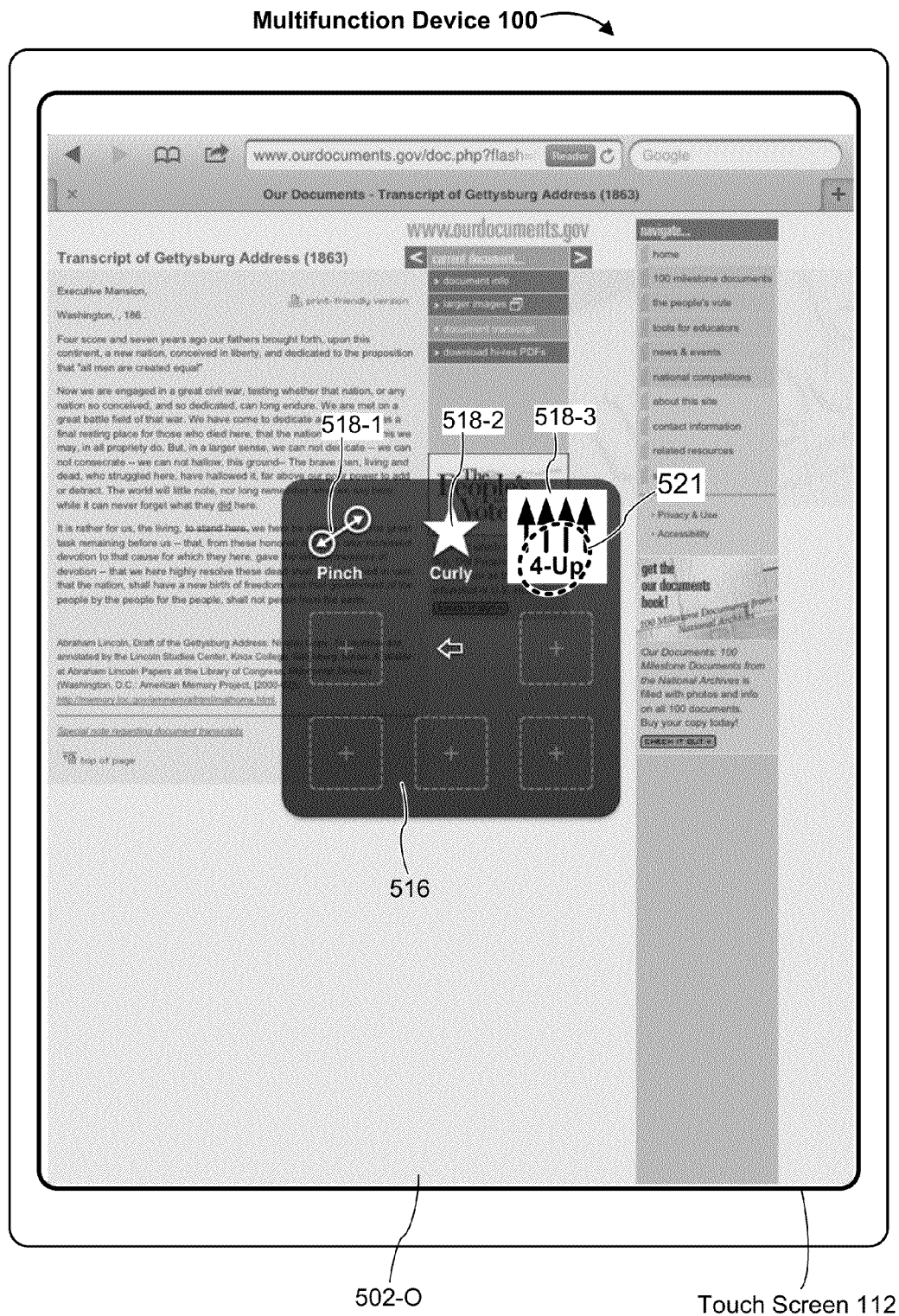

Illustrated in FIG. 5O is user interface 502-O, which shows that touch gesture 521 (e.g., a tap gesture) is detected at a location that corresponds to four-finger swipe-up gesture icon 518-3 in menu 516.

Figure 5P:
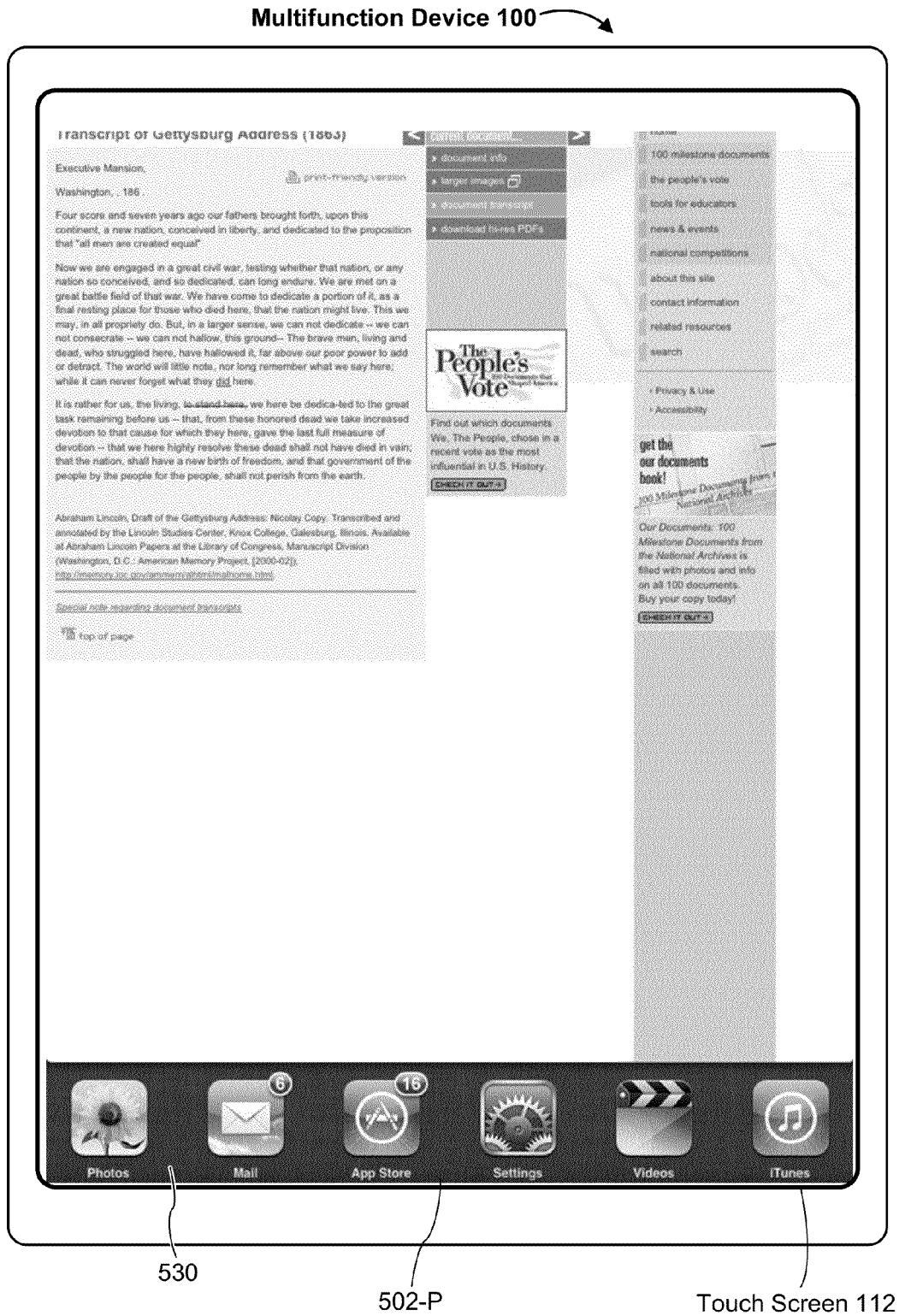

FIG. 5P shows that, in response to detecting single-touch gesture 521 (FIG. 5O) at the location that corresponds to four-finger swipe-up gesture icon 518-3 (FIG. 5O), application icon area 530 that includes a plurality of open application icons is displayed, which is the same response that occurs when an actual four-finger swipe-up gesture is detected on touch screen 112.

Figure 5Q:
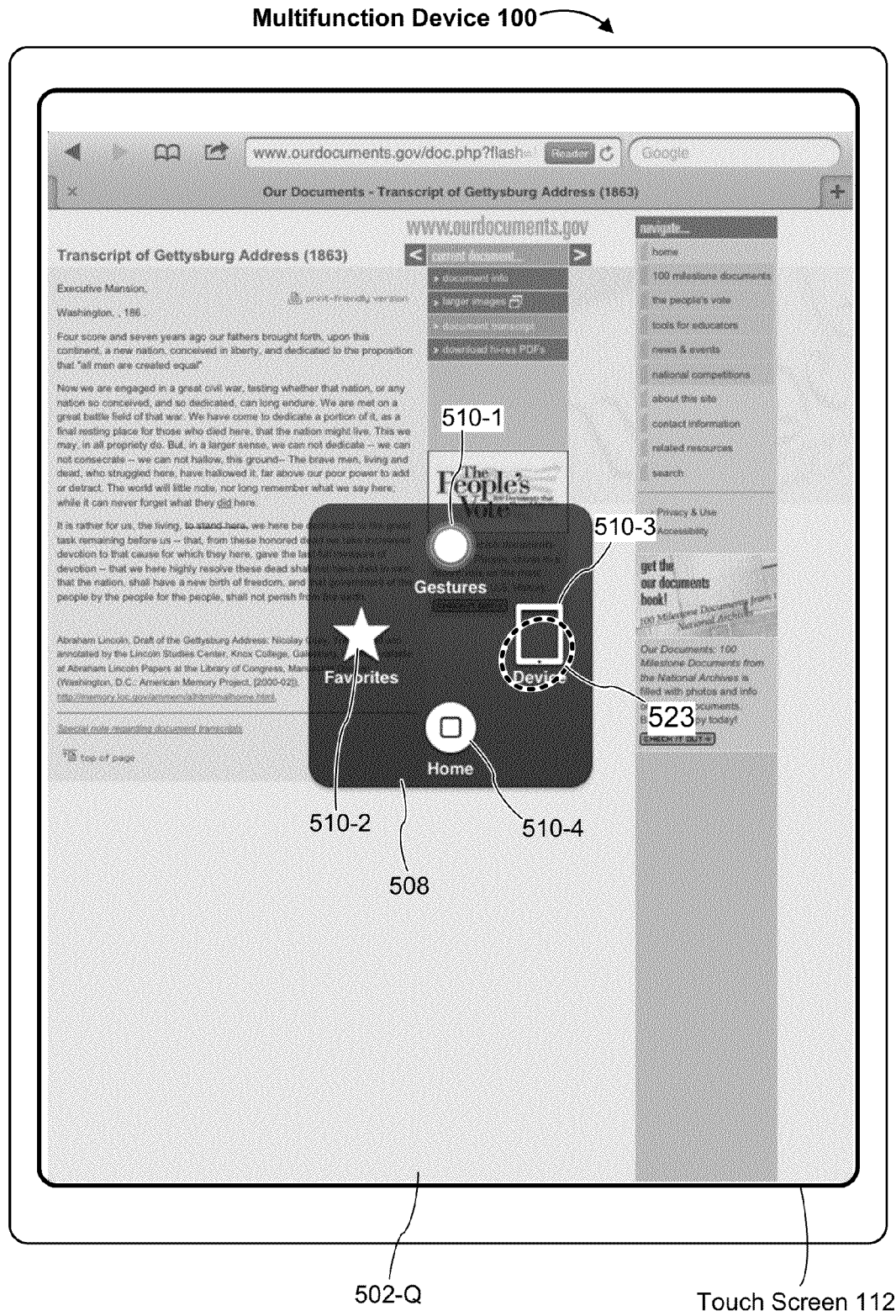

FIG. 5Q illustrates user interface 502-Q, where touch gesture 523 (e.g., a tap gesture) is detected at a location that corresponds to icon 510-3 of menu 508, thereby selecting icon 510-3 in menu 508. In some embodiments, icon 510-3 is called a virtual device icon.

Figure 5R:
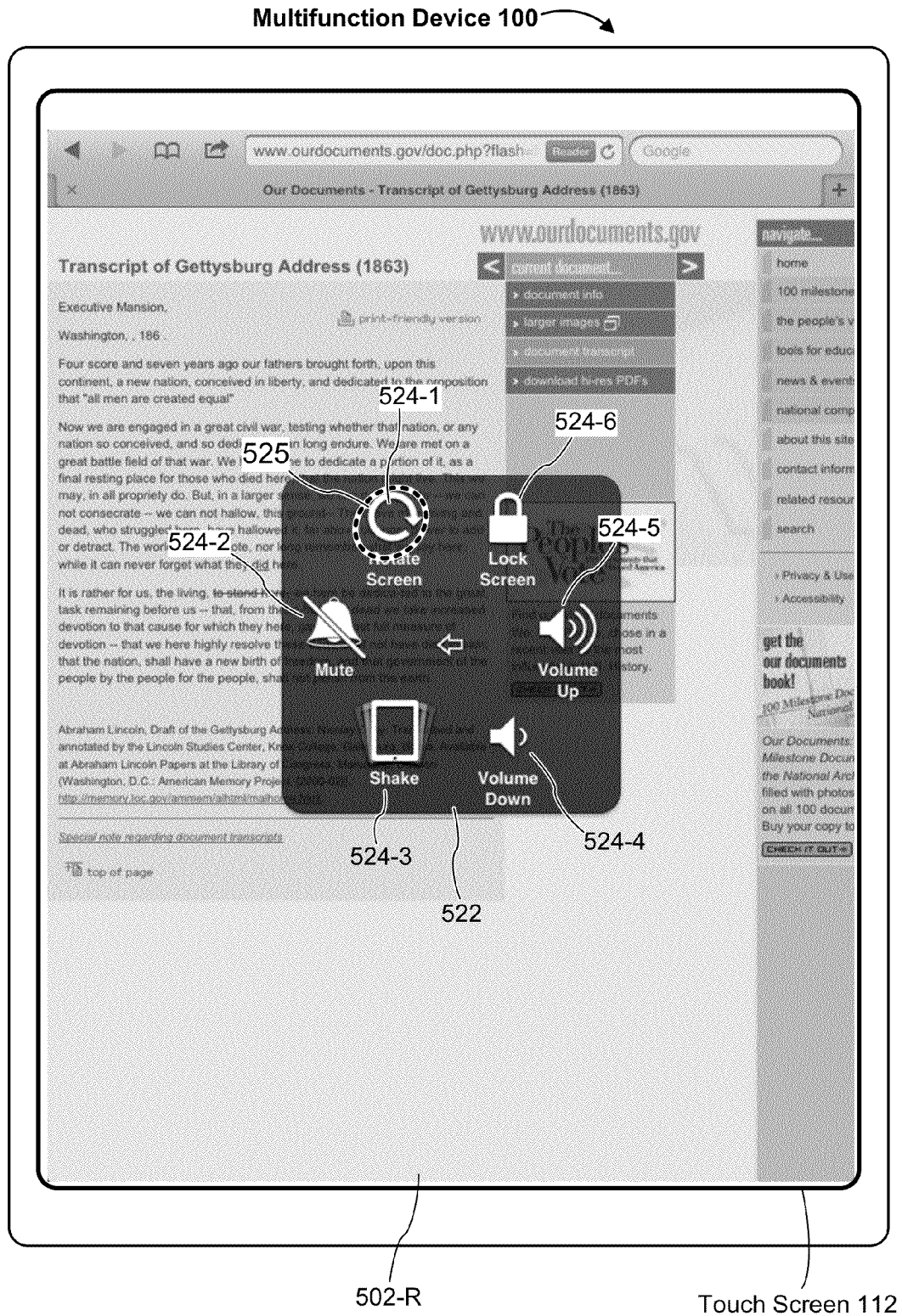

FIG. 5R illustrates user interface 502-R, where, in response to detecting selection of icon 510-3 (e.g., the virtual device icon) in FIG. 5Q, menu 522 is displayed on touch screen 112. In some embodiments, menu 522 is called a menu of virtual device operations. In FIG. 5R, menu 522 includes a plurality of icons representing types of virtual device operations (e.g., rotate screen 524-1, muting/unmuting 524-2, shake 524-3, volume down 524-4, volume up 524-5, lock screen 524-6, etc.). In FIG. 5R, single-touch gesture 525 (e.g., a tap gesture) is detected at a location that corresponds to icon 524-1, thereby selecting rotate screen icon 524-1 (also called a virtual device rotation icon).

Figure 5S:
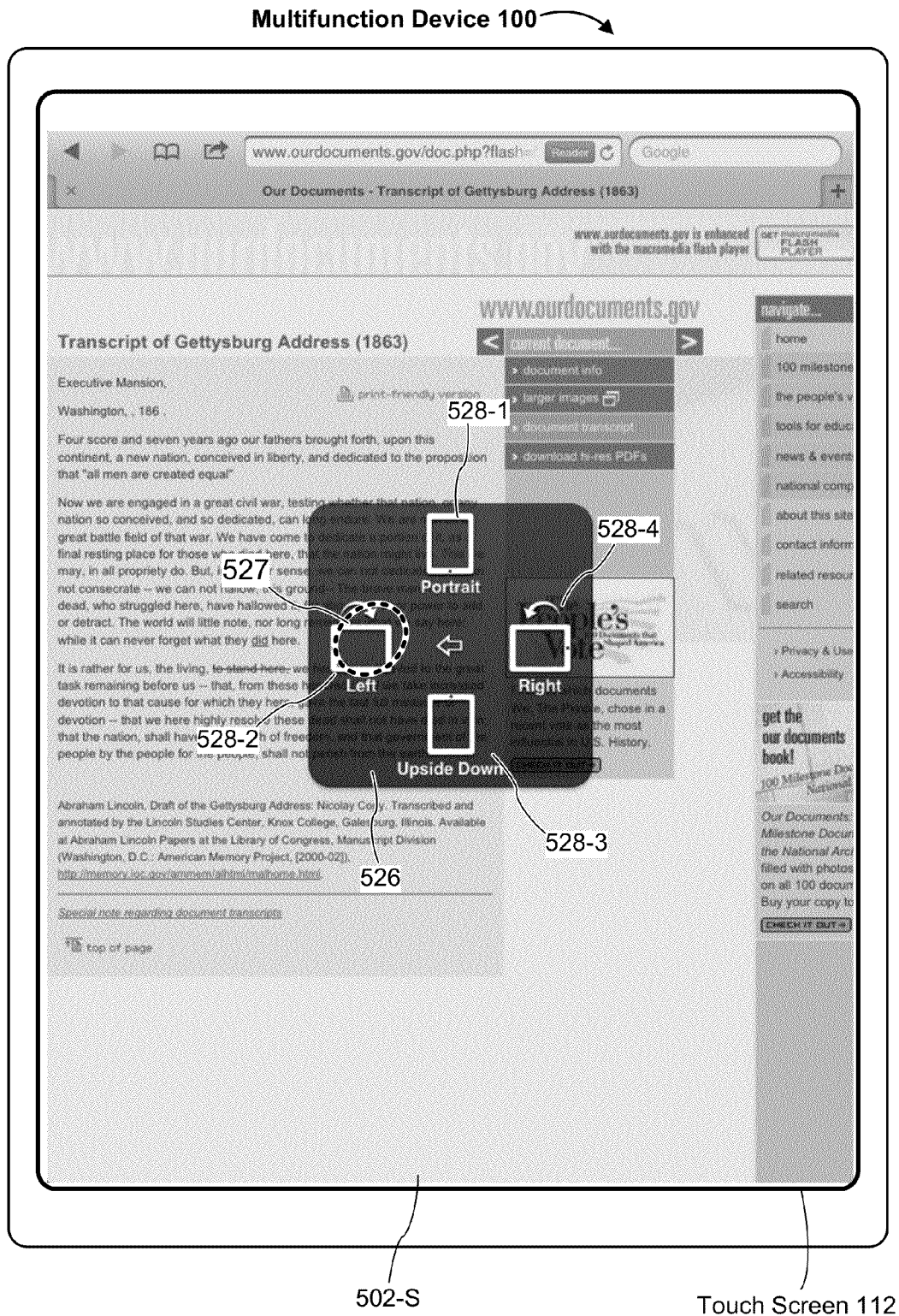

FIG. 5S illustrates user interface 502-S, where, in response to detecting selection of rotate screen icon 524-1, menu 526 is displayed. In some embodiments, menu 526 is called a menu of virtual device orientations. Menu 526, shown in FIG. 5S, includes a plurality of icons representing types of virtual device orientations (e.g., portrait orientation 528-1, rotate left to landscape orientation 528-2, upside down in portrait orientation 528-3, rotate right to landscape orientation 528-4, etc.).

FIG. 5S also illustrates that single-touch gesture 527 (e.g., a tap gesture) is detected at a location that corresponds to rotate left to landscape orientation icon 528-2.

Figure 5T:
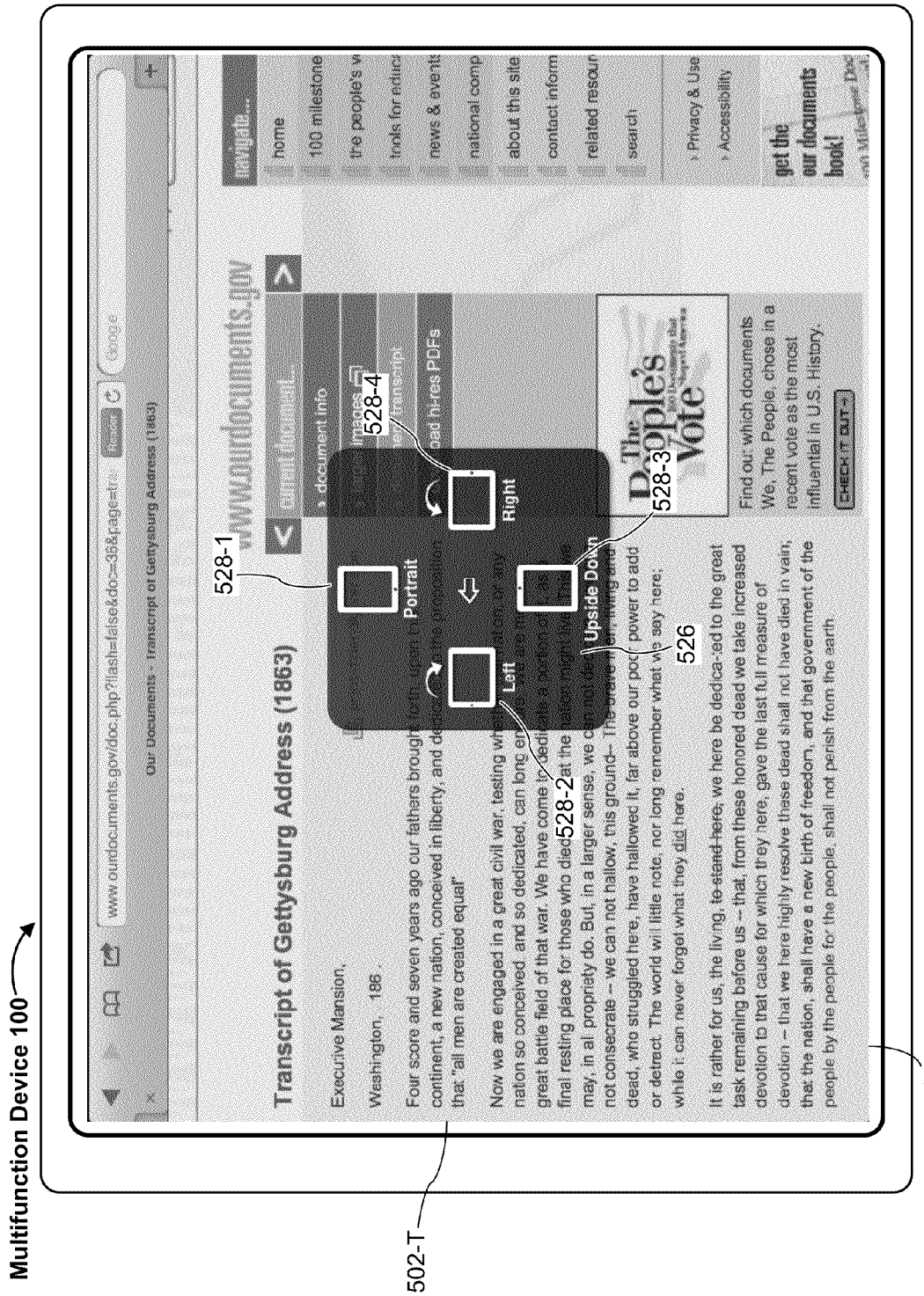

FIG. 5T shows user interface 502-T, which is displayed in response to detecting activation of rotate left to landscape orientation icon 528-2 by single-touch gesture 527. User interface 502-T includes a portion of the same web page shown in FIG. 5S. However, user interface 502-T in FIG. 5T is displayed in a landscape orientation instead of the portrait orientation shown in FIG. 5S.

Figure 5U:
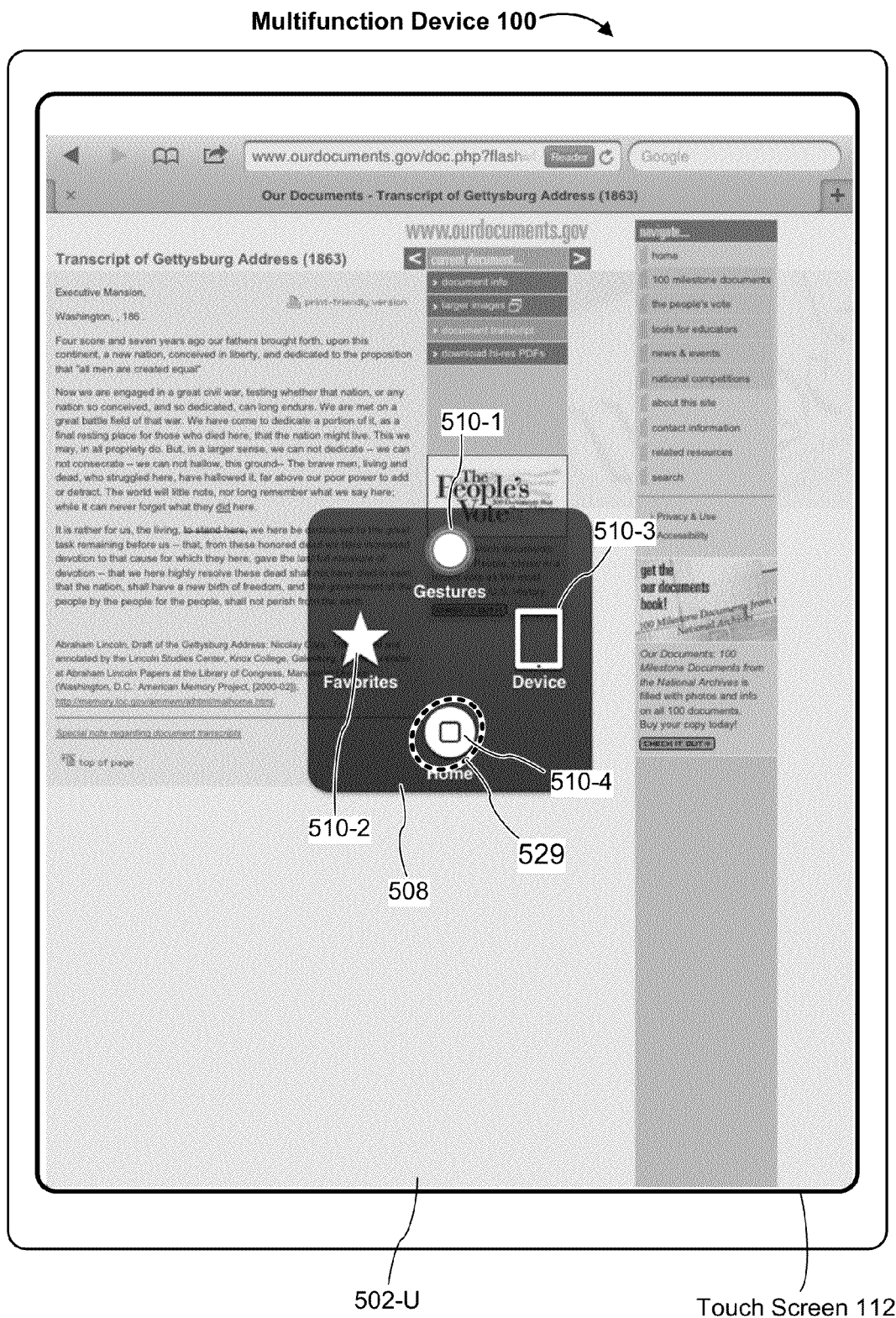
Figure 5V:
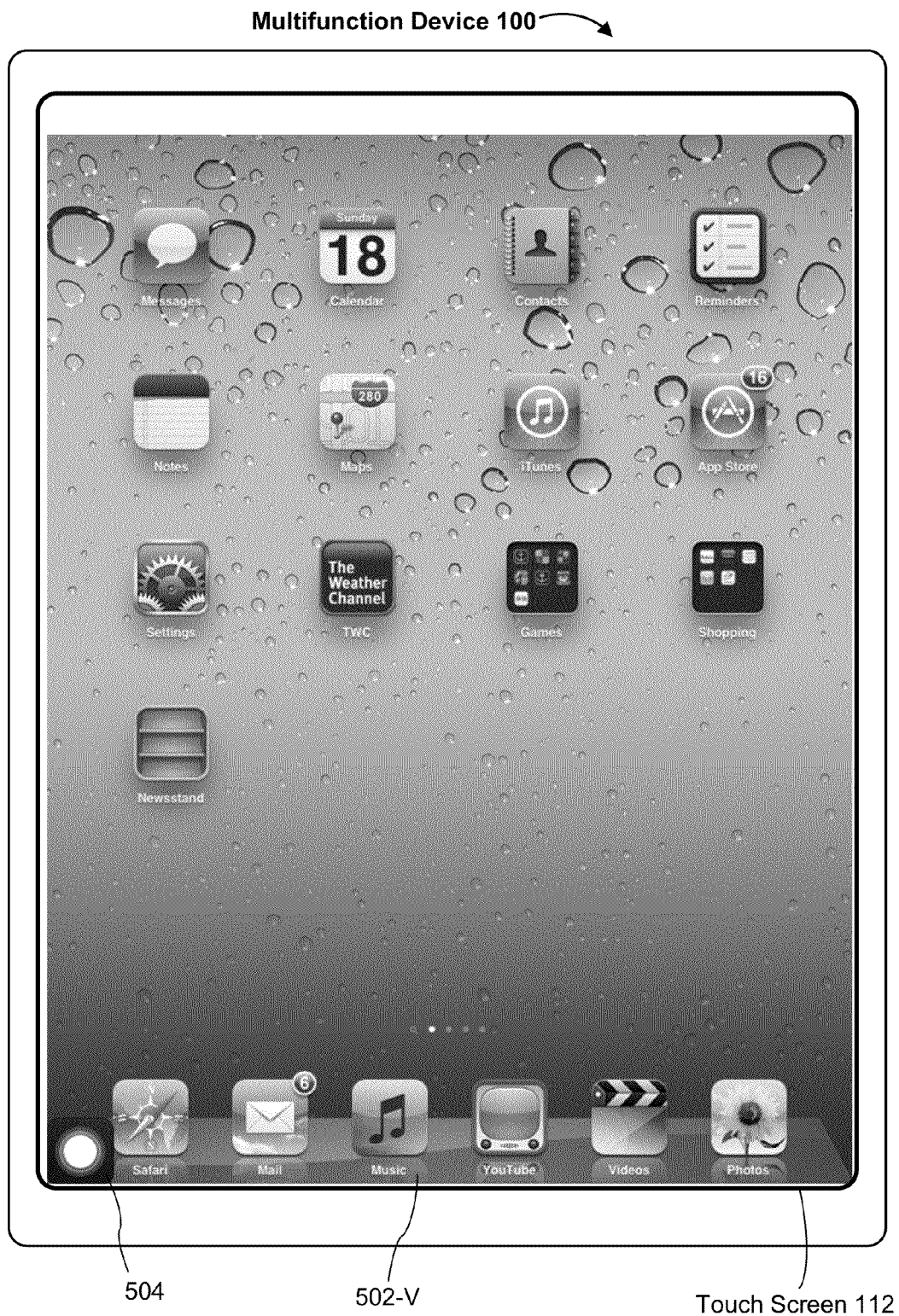

FIG. 5U illustrates user interface 502-U, where touch gesture 523 (e.g., a tap gesture) is detected at a location that corresponds to icon 510-4 of menu 508, thereby selecting icon 510-4 in menu 508. In some embodiments, icon 510-4 is called a home button icon.

FIG. 5V illustrates exemplary user interface 502-V displayed on touch screen 112 in response to detecting selection of icon 510-4 (e.g., the home button icon) in FIG. 5U. For example, a home screen of the device may be displayed in response to detecting selection of icon 510-4.

FIGS. 6A-6D are flow diagrams illustrating method 600 of providing accessibility to a touch-based user interface with multitouch gestures using single touch inputs in accordance with some embodiments. Method 600 is performed at an electronic device (e.g., device 300, FIG. 3, or portable multifunction device 100, FIG. 1) with a display and a multi-touch-sensitive surface configured to receive single touch inputs as well as multitouch inputs. In some embodiments, the display is a touch screen display and the touch-sensitive surface is on the display. In some embodiments, the display is separate from the touch-sensitive surface. Some operations in method 600 may be combined and/or the order of some operations may be changed.

As described below, method 600 makes devices with touch-based user interfaces that include multitouch gestures accessible to users who can provide inputs with only a single touch (e.g., a single finger or other single contact). The method makes it possible for such users to perform operations that would otherwise require multitouch interaction with the touch-sensitive surface of the device. In some embodiments, method 600 also makes devices with hardware features that require manual dexterity accessible to users who can provide inputs with only a single touch. The method makes it possible for such users to perform operations with a single touch that would otherwise require manual dexterity (e.g., rotating or shaking the device).

The device displays (602), on the display, a first visual indicator (e.g., visual indicator 504, FIG. 5A).

In some embodiments, the first visual indicator is (604) configured to move in accordance with a touch gesture by a single touch on a touch-sensitive surface (e.g., a drag gesture by one finger or a pointing device, such as a stylus). For example, in FIGS. 5B and 5C, visual indicator 504 moves in accordance with touch gesture 503 on touch screen 112.

In some embodiments, the first visual indicator is (606) located at a periphery of the display when no touch input is detected on the touch-sensitive surface (e.g., visual indicator 504, FIG. 5A). For example, in FIG. 5D, visual indicator 504 moves to a periphery of touch screen 112 when touch gesture 503 is terminated.

The device detects (608) a first single touch input (e.g., a tap gesture with a single finger, such as touch gesture 505, FIG. 5D) on the touch-sensitive surface at a location that corresponds to the first visual indicator. As used in the specification and claims, a single touch input refers to an input made with a single contact, such as a one-finger contact or a single pointing device contact. In contrast, inputs that include multiple simultaneous contacts, such as two-finger, three-finger, or four-finger inputs or other multitouch inputs are not single touch inputs.

In response to detecting the first single touch input on the touch-sensitive surface at the location that corresponds to the first visual indicator, the device replaces (610) display of the first visual indicator with display of a first menu (e.g., FIG. 5E). The first menu includes a virtual touches selection icon (e.g., gestures icon 510-1 in FIG. 5E). In response to detecting selection of the virtual touches selection icon, a menu of virtual multitouch contacts is displayed (e.g., menu 512, FIG. 5F). In some embodiments, the first visual indicator is a user interface object, which, when selected by a single touch input, initiates display of the first menu. In some embodiments, in response to detecting the first single touch input on the touch-sensitive surface at the location that corresponds to the first visual indicator, the device displays the first menu and maintains display of the first visual indicator (not shown).

In some embodiments, the first menu includes (612) icons displayed radially about a center of the first menu (e.g., a concentric arrangement about the center). For example, menu 508 in FIG. 5E includes icons 510-1, 510-2, 510-3, and 510-4 displayed radially about a center of menu 508. As additional examples, icons in some other menus described herein (e.g., menu 512 in FIG. 5F, menu 516 in FIG. 5K, menu 522 in FIG. 5R, and menu 526 in FIG. 5S) are displayed radially about a center of the corresponding menu. This arrangement of icons in the menu makes each icon readily accessible.

In some embodiments, a first user interface is displayed (614) on the display immediately prior to detecting the first single touch input on the touch-sensitive surface (e.g., FIG. 5D), and the first menu is displayed over the first user interface (e.g., as a semitransparent, translucent, or opaque overlay as shown in FIG. 5E). Similarly, the other menus described herein (e.g., menu 512 in FIG. 5F, menu 516 in FIG. 5K, menu 522 in FIG. 5R, and menu 526 in FIG. 5S) may be displayed as semitransparent, translucent, or opaque overlays on an underlying standard user interface. These overlay menus help make control of the electronic device using single touch inputs quite similar to the control of the device using multitouch inputs.

In some embodiments, in response to detecting the first single touch input, the device displays (616) the first menu in a center region of the display. For example, in FIG. 5E, menu 508 is displayed in a center region of touch screen 112 when menu 508 is initially displayed. Displaying the menu in the center region of the display makes each of the options in the first menu readily accessible. Similarly, the other menus described herein may be displayed initially in the center region of touch screen 112 (e.g., menu 512 in FIG. 5F, menu 516 in FIG. 5K, menu 522 in FIG. 5R, and menu 526 in FIG. 5S) when those menus are displayed in response to respective single touch inputs.

In some embodiments, the first menu is configured to move in accordance with a touch gesture on the touch-sensitive surface (e.g., the first menu may be dragged across the display in accordance with a dragging gesture).

In some embodiments, while displaying the first menu on the display, the device detects (618) a second single touch input on the touch-sensitive surface at a location that does not correspond to the first menu (e.g., single touch gesture 599, FIG. 5E). In response to detecting the second single touch input on the touch-sensitive surface, the device replaces display of the first menu with display of the first visual indicator (e.g., visual indicator 504, FIG. 5D). Similarly, the other menus described herein (e.g., menu 512 of virtual multitouch contacts in FIG. 5F, menu 516 of virtual gestures in FIG. 5K, menu 522 of virtual device operations in FIG. 5R, menu 526 of virtual device rotations in FIG. 5S, or any accessible menu) may be dismissed when a single touch input is detected on the touch-sensitive surface at a location that does not correspond to the respective menu.

In some embodiments, while displaying the first menu on the display, the device waits (620) to detect input on the touch-sensitive surface for more than a predefined time period (e.g., 5 seconds, 10 seconds, 15 seconds, or any reasonable time period). In some embodiments, the predefined time period is set by a user (e.g., via a settings menu). In response to waiting to detect input on the touch-sensitive surface for more than the predefined time period (e.g., without detecting input on the touch-sensitive surface), the device replaces display of the first menu with display of the first visual indicator (e.g., visual indicator 504, FIG. 5D). Similarly, the other menus described herein (e.g., menu 512 of virtual multitouch contacts in FIG. 5F, menu 516 of virtual gestures in FIG. 5K, menu 522 of virtual device operations in FIG. 5R, menu 526 of virtual device rotations in FIG. 5S, or any accessible menu) may be dismissed when input is not detected on the touch-sensitive surface within a predefined time period.

In some embodiments, the device detects (622, FIG. 6B) selection of the virtual touches selection icon (e.g., by a single touch input, such as touch gesture 507 on icon 510-1, FIG. 5E). In response to detecting selection of the virtual touches selection icon (e.g., by the single touch input), the device displays the menu of virtual multitouch contacts (e.g., menu 512, FIG. 5F). The menu of virtual multitouch contacts includes a plurality of icons representing types of virtual multitouch contacts (e.g., two-finger contacts icon 514-1, three-finger contacts icon 514-2, four-finger contacts icon 514-3, and five-finger contacts icon 514-4 in menu 512, FIG. 5F). The device detects selection of a respective virtual multitouch contacts icon in the menu of virtual multitouch contacts (e.g., detecting selection of the virtual four-finger contacts icon 514-3 in FIG. 5F by single touch input 509). In response to detecting selection of the respective virtual multitouch contacts icon in the menu of virtual multitouch contacts, the device displays one or more second visual indicators (e.g., visual indicators 506-1 through 506-4 in FIG. 5G) that correspond to the respective virtual multitouch contacts icon. In some embodiments, in response to detecting selection of the respective virtual multitouch contacts icon in the menu of virtual multitouch contacts, the device also ceases to display the menu of virtual multitouch contacts (e.g., menu 512 is not displayed in FIG. 5G). In some embodiments, the second visual indicators are part of a single icon that represents multiple contacts that correspond to the respective virtual multitouch contacts icon. Therefore, the one or more second visual indicators typically move in unison (e.g., moving a same distance in a same direction at a same speed). In some embodiments, the second visual indicators are multiple icons that represent multiple contacts that correspond to the respective virtual multitouch contacts icon.

In some embodiments, displaying the second visual indicators includes (624) displaying a number of visual indicators that correspond to the respective virtual multitouch contacts icon. For example, in response to selection of the virtual four-finger contacts icon 514-3 in FIG. 5F, four visual indicators that correspond to four virtual touches are displayed in FIG. 5G. Similarly, in response to selection of the virtual two-finger contacts icon 514-1 in FIG. 5F, the device displays two visual indicators that correspond to two virtual touches (not shown); in response to selection of the virtual three-finger contacts icon 514-2 in FIG. 5F, the device displays three visual indicators that correspond to four virtual touches (not shown); and, in response to selection of the virtual five-finger contacts icon 514-4 in FIG. 5F, the device displays five visual indicators that correspond to five virtual touches (not shown).

In some embodiments, in response to detecting selection of the respective virtual multitouch contacts icon in the menu of virtual multitouch contacts, the device ceases (626) to display the menu of virtual multitouch contacts and redisplays the first visual indicator (e.g., at a location on the periphery of the display as shown in FIG. 5G).

In some embodiments, while displaying the one or more second visual indicators, the device detects (628) a third single touch on the touch-sensitive surface (e.g., a single touch of touch gesture 511, FIG. 5H). In response to detecting the third single touch on the touch-sensitive surface, the device moves the one or more second visual indicators to a first display location on the display, where the first display location corresponds to an initial location of the third single touch on the touch-sensitive surface. For example, in FIG. 5H, visual indicators 506-1 through 506-4 are moved such that the centroid of visual indicators 506-1 through 506-4 is moved to a location of the third single touch. For clarity, moving a plurality of second visual indicators to the first display location does not move each visual indicator to the exact same location, which would cause the visual indicators to overlap and obscure each other. Rather, at least some separation between the plurality of visual indicators is maintained. In some embodiments, the plurality of visual indicators maintain their positions relative to each other as they are moved to respective positions about the first display location. The device detects movement of the third single touch across the touch-sensitive surface; and, in response to detecting the movement of the third single touch across the touch-sensitive surface, moves the one or more second visual indicators on the display in accordance with the movement of the third single touch across the touch-sensitive surface. While moving the one or more second visual indicators in accordance with the movement of the third single touch across the touch-sensitive surface, the device performs an operation that corresponds to the movement of the one or more second visual indicators in accordance with the movement of the third single touch across the touch-sensitive surface. For example, while moving four visual indicators 506-1 through 506-4 in accordance with left-swipe single-touch gesture 511, the device replaces display of the web browser application with display of a settings application (FIGS. 5H and 5I). Alternatively, while moving four visual indicators 506-1 through 506-4 in accordance with a swipe-up single-touch gesture (not shown), the device may display application icon area 530 that includes a plurality of open application icons (FIG. 5P).

In some embodiments, the device displays (630, FIG. 6C) a virtual gestures icon (e.g., icon 510-2 in menu 508, FIG. 5J); detects selection of the virtual gestures icon (e.g., by a single touch input, such as touch gesture 513, FIG. 5J); and, in response to detecting selection of the virtual gestures icon (e.g., by the single touch input), displays a menu of virtual gestures (e.g., menu 516, FIG. 5K). The menu of virtual gestures includes a plurality of icons representing types of virtual gestures (e.g., icons 518, FIG. 5K). The device detects selection of a respective virtual gesture icon in the menu of virtual gestures (e.g., by a single touch input, such as touch gesture 515, FIG. 5K); and, in response to detecting selection of the respective virtual gesture icon in the menu of virtual gestures (e.g., by the single touch input), performs an action that corresponds to the respective virtual gesture. For example, in response to selection of the virtual four-finger swipe up gesture icon 518-3 in FIG. 5O by a single-finger tap gesture (not shown) on icon 518-3, the device displays application icon area 530 that includes a plurality of open application icons (FIG. 5P). In some embodiments, the device may perform actions corresponding to certain gestures without displaying visual indicators that correspond to the gestures (e.g., open application icon area 530 may be displayed without displaying visual indicators that correspond to the four-finger swipe up gesture).

In some embodiments, the device displays (632) a virtual gestures icon (e.g., icon 510-2 in menu 508, FIG. 5J); detects selection of the virtual gestures icon (e.g., by a single touch input, such as touch gesture 513, FIG. 5J); and, in response to detecting selection of the virtual gestures icon (e.g., by the single touch input), displays a menu of virtual gestures (e.g., menu 516, FIG. 5K). The menu of virtual gestures includes a plurality of icons representing types of virtual gestures (e.g., virtual two-finger pinch/depinch gesture icon 518-1, virtual curly gesture icon 518-2, and virtual four-finger swipe up gesture icon 518-3, FIG. 5I). The device detects selection of a respective virtual gesture icon in the menu of virtual gestures (e.g., by a single touch input, such as touch gesture 515, FIG. 5K); and, in response to detecting selection of the respective virtual gesture icon in the menu of virtual gestures (e.g., by the single touch input), displays a number of visual indicators that correspond to the respective virtual gesture icon. For example, in response to selection of virtual two-finger pinch/depinch gesture icon 518-1 in FIG. 5K, two visual indicators that correspond to two virtual touches are displayed in FIG. 5L. The device detects a fourth single touch input on the touch-sensitive surface; and, in response to detecting the fourth single touch input on the touch-sensitive surface, performs an operation in accordance with the respective virtual gesture. For example, in FIGS. 5M and 5N, single-touch gesture 519 on touch screen 112 moves two visual indicators 520-1 and 520-2 and displays the user interface at a different magnification (e.g., a zooming operation in accordance with a virtual depinch gesture).

In some embodiments, in response to detecting the fourth single touch input on the touch-sensitive surface, the device moves (634) the displayed visual indicators that correspond to the respective virtual gesture to simulate movement of multiple contacts on the touch-sensitive surface (e.g., in FIGS. 5M and 5N, single-touch gesture 519 on touch screen 112 moves two visual indicators 520-1 and 520-2).

In some embodiments, the device displays (636) a pinch/depinch gesture icon (e.g., pinch/depinch gesture icon 518-1 in first menu 516 or in a virtual gestures menu); detects selection of the virtual pinch/depinch gesture icon (e.g., by a single touch input on the virtual pinch/depinch gesture icon, such as touch gesture 515, FIG. 5K); and, in response to detecting selection of the virtual pinch/depinch gesture icon, displays two visual indicators that correspond to contacts in the virtual pinch/depinch gesture (e.g., visual indicators 520-1 and 520-2, FIG. 5L). The device detects a fifth single touch input on the touch-sensitive surface (e.g., touch gesture 519, FIG. 5M); and, in response to detecting the fifth single touch input on the touch-sensitive surface, performs an operation in accordance with the virtual pinch/depinch gesture. In some embodiments, while the two visual indicators that correspond to contacts in the virtual pinch/depinch gesture are displayed, single touch inputs detected on the touch-sensitive surface are used to perform actions that correspond to an actual pinch/depinch gesture on the touch-sensitive surface. For example, a single touch input on the touch-sensitive surface may be used to move the two visual indicators 520-1 and 520-2 apart (depinch) and zoom in the display. Conversely, a single touch input on the touch-sensitive surface may be used to move the two visual indicators 520-1 and 520-2 together (pinch) and zoom out the display. Thus, a user can use a single touch input to operate an electronic device with a multitouch-based user interface (e.g., perform virtual gestures on the display, etc.), without using multiple fingers.

In some embodiments, a zooming operation (e.g., zooming in the display or zooming out the display) is performed (638) in accordance with the virtual pinch/depinch gesture (e.g., see the zoomed-in user interface 502-N in FIG. 5N).

In some embodiments, the device displays (640, FIG. 6D) a virtual device icon (e.g., icon 510-3 in first menu 508, as shown in FIG. 5Q); detects selection of the virtual device icon (e.g., by a single touch input, such as touch gesture 523, FIG. 5Q); and, in response to detecting selection of the virtual device icon, displays a menu of virtual device operations (e.g., menu 522 in FIG. 5R). The menu of virtual device operations includes a plurality of icons representing types of virtual device operations (e.g., icons 524 in FIG. 5R). Exemplary virtual device operations may include operations that are normally performed via physical controls on the electronic device, such as: muting and unmuting the ringer and sound effects on the device, which is normally performed via a mute switch; locking the device, which is normally initiated via a lock/unlock switch; increase volume, which is normally performed via a volume up button; decrease volume, which is normally performed via a volume down button. Exemplary virtual device operations may also include shaking the electronic device to perform a predefined operation (e.g., an undo operation) and rotating the electronic device to rotate the display orientation. Operations like shaking and rotation are typically detected via an accelerometer and/or a gyroscope in the electronic device. The device detects selection of a respective virtual device operation icon in the menu of virtual device operations (e.g., by a single touch input on the touch-sensitive surface, such as touch gesture 525 at a location corresponding to virtual device rotation icon 524-1, FIG. 5R); and, in response to detecting selection of the respective virtual device operation icon in the menu of virtual device operations, performs an action that corresponds to the respective virtual device operation. For example, in response to selection of virtual device lock screen icon 524-6 in FIG. 5R, the device locks the screen of the device or launches a screen saver application (not shown). Thus, a user can also use single touch inputs on the touch-sensitive surface to operate the physical controls on the electronic device, even though the user does not actually touch the physical controls on the device.

In some embodiments, the device displays (642) a virtual device rotation icon (e.g., icon 524-1 in menu 522 of virtual device operations, FIG. 5R); detects selection of the virtual device rotation icon (e.g., by a single touch input, such as gesture 525, in FIG. 5R); and, in response to detecting selection of the virtual device rotation icon, displays a menu of virtual device orientations (e.g., menu 526, FIG. 5S). The menu of virtual device orientations includes a plurality of icons representing types of virtual device orientations (e.g., virtual portrait orientation icon 528-1, virtual landscape orientation left icon 528-2, virtual landscape orientation right icon 528-4, and virtual upside down portrait orientation icon 528-3, FIG. 5S). The device detects selection of a respective virtual device orientation icon in the menu of virtual device orientations (e.g., by a single touch input on the touch-sensitive surface, such as touch gesture 527 at a location corresponding to virtual landscape orientation left icon 528-2); and, in response to detecting selection of the respective virtual device orientation icon in the menu of virtual device orientations, orients the display in accordance with the respective virtual device orientation. For example, in response to selection of the virtual landscape orientation left icon 528-2 in FIG. 5S, the device changes the orientation of the user interface to that shown in FIG. 5T.

In some embodiments, the device includes (644) a home button (e.g., a virtual home button displayed on the display or a physical home button 204 separate from the display, FIG. 2). The device displays a home button icon (e.g., icon 510-4, in first menu 508, FIG. 5U, or in the menu of virtual device operations); detects selection of the home button icon (e.g., by a single touch input on the touch-sensitive surface, such as touch gesture 529 at a location corresponding to icon 510-4); and, in response to detecting selection of the home button icon, performs an action that corresponds to activation of the home button. For example, in response to selection of home button icon 510-4 in FIG. 5U, home screen 502-V is displayed in FIG. 5V, just as if the home button 204 (FIG. 2) had been pressed.

Note that details of the processes described above with respect to method 600 are also applicable in an analogous manner to the other methods described herein, including methods 700, 800, 900, 1000, 1100, and 1200 described below. For brevity, these details are not repeated below.

Figure 7:
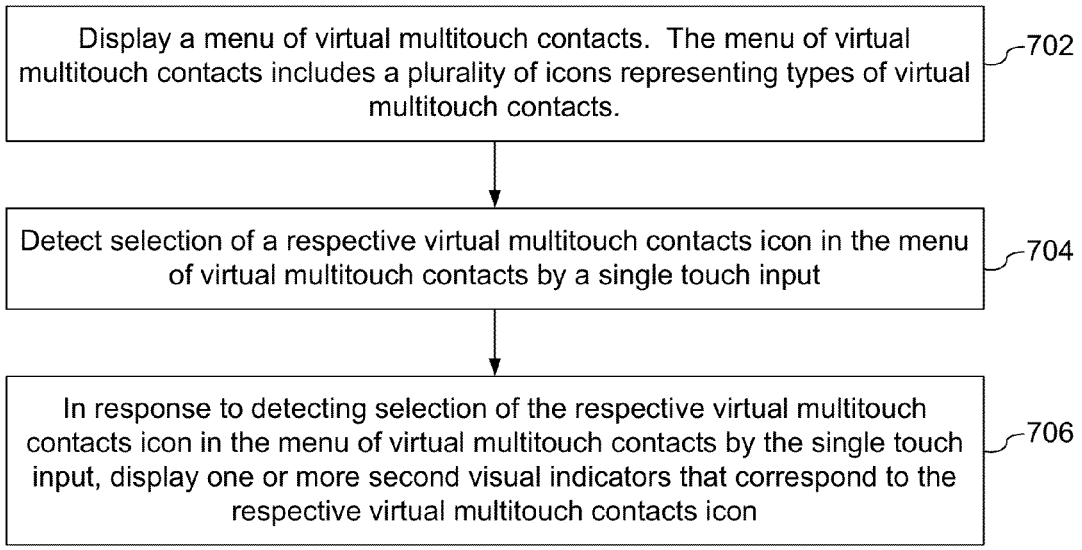
FIG. 7 is a flow diagram illustrating a method of using a menu of virtual multitouch contacts icon based on single touch inputs in accordance with some embodiments.

FIG. 7 is a flow diagram illustrating method 700 of using a menu of virtual multitouch contacts icon in accordance with some embodiments. Method 700 is performed at an electronic device (e.g., device 300, FIG. 3, or portable multifunction device 100, FIG. 1) with a display and a multitouch-sensitive surface. In some embodiments, the display is a touch screen display and the touch-sensitive surface is on the display. In some embodiments, the display is separate from the touch-sensitive surface. Some operations in method 700 may be combined and/or the order of some operations may be changed.

As described below, method 700 uses a menu of virtual multitouch contacts in conjunction with a single touch input on the touch-sensitive surface to select a type of multitouch contact being emulated. This enables the user to perform, without using multiple fingers, multitouch operations that would otherwise require interaction with the touch-sensitive surface of the electronic device using multiple fingers.

The device displays (702) a menu of virtual multitouch contacts (e.g., menu 512, FIG. 5F). The menu of virtual multitouch contacts includes a plurality of icons representing types of virtual multitouch contacts (e.g., two-finger contacts icon 514-1, three-finger contacts icon 514-2, four-finger contacts icon 514-3, and five-finger contacts icon 514-4 in menu 512, FIG. 5F).

The device detects (704) selection of a respective virtual multitouch contacts icon in the menu of virtual multitouch contacts by a single touch input (e.g., touch gesture 509, FIG. 5F); and, in response to detecting selection of the respective virtual multitouch contacts icon in the menu of virtual multitouch contacts by the single touch input, displays (706) one or more second visual indicators that correspond to the respective virtual multitouch contacts icon (e.g., visual indicators 506-1 through 506-4, FIG. 5G). In some embodiments, in response to detecting selection of the respective virtual multitouch contacts icon in the menu of virtual multitouch contacts, the device also ceases to display the menu of virtual multitouch contacts. In some embodiments, the second visual indicators are part of a single icon that represents multiple contacts that correspond to the respective virtual multitouch contacts icon. In some embodiments, the second visual indicators are multiple icons that represent multiple contacts that correspond to the respective virtual multitouch contacts icon.

Figure 8:
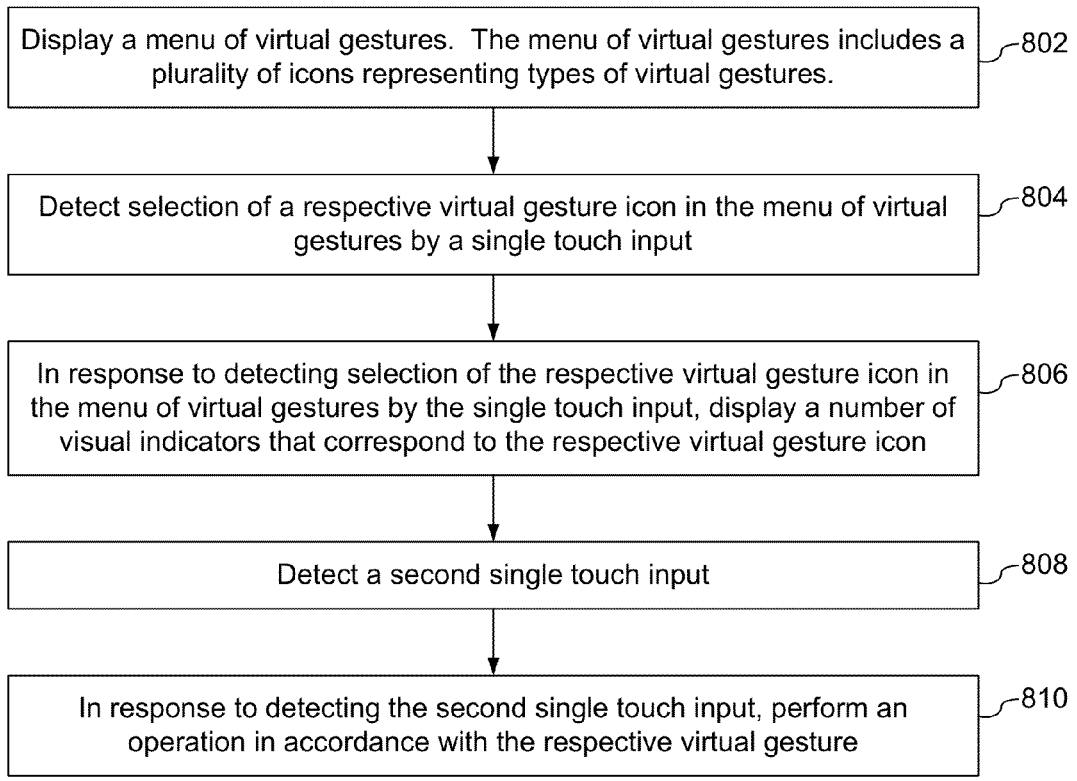
FIG. 8 is a flow diagram illustrating a method of using a menu of virtual gestures based on single touch inputs in accordance with some embodiments.

FIG. 8 is a flow diagram illustrating a method 800 of using a menu of virtual gestures in accordance with some embodiments. Method 800 is performed at an electronic device (e.g., device 300, FIG. 3, or portable multifunction device 100, FIG. 1) with a display and a multitouch-sensitive surface. In some embodiments, the display is a touch screen display and the touch-sensitive surface is on the display. In some embodiments, the display is separate from the touch-sensitive surface. Some operations in method 800 may be combined and/or the order of some operations may be changed.

As described below, method 800 uses a menu of virtual gestures in conjunction with a single touch input on the touch-sensitive surface to select and emulate actual gestures on a touch-sensitive surface. This allows a user to make, without using multiple fingers, virtual multitouch gestures that produce the same results as those obtained by interacting with the touch-sensitive surface of the electronic device using multiple fingers.

The device displays (802) a menu of virtual gestures (e.g., menu 516, FIG. 5K). The menu of virtual gestures includes a plurality of icons representing types of virtual gestures (e.g., virtual two-finger pinch/depinch gesture icon 518-1, virtual curly gesture icon 518-2, and virtual four-finger swipe up gesture icon 518-3, FIG. 5K).

The device detects (804) selection of a respective virtual gesture icon in the menu of virtual gestures by a single touch input (e.g., touch gesture 515, FIG. 5K); and, in response to detecting selection of the respective virtual gesture icon in the menu of virtual gestures by the single touch input, displays (806) a number of visual indicators that correspond to the respective virtual gesture icon. For example, in response to selection of the virtual two-finger pinch/depinch gesture icon 518-1 in FIG. 5K, two visual indicators that correspond to two virtual touches are displayed in FIG. 5L.

The device detects (808) a second single touch input on the touch-sensitive surface; and, in response to detecting the second single touch input on the touch-sensitive surface, performs (810) an operation in accordance with the respective virtual gesture. For example, in FIGS. 5M and 5N, single touch input 519 moves visual indicators 520-1 and 520-2 and displays the user interface at a different magnification (e.g., a zooming operation).

Figure 9:
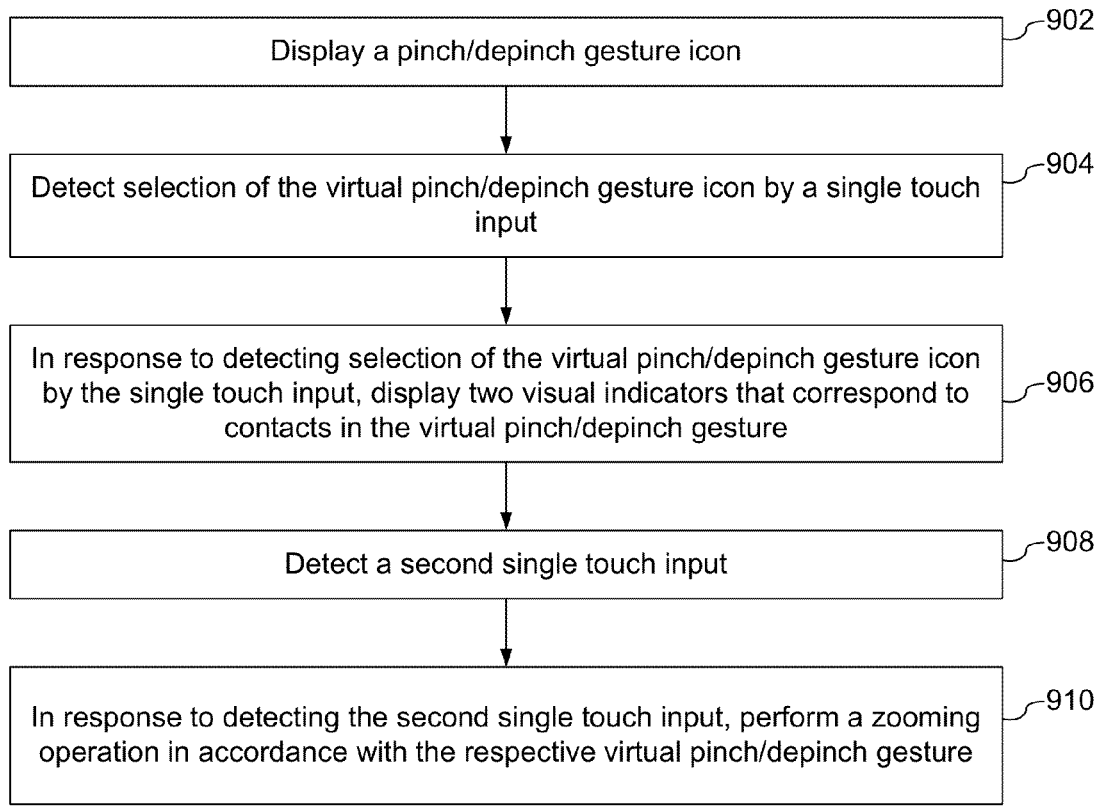
FIG. 9 is a flow diagram illustrating a method of performing a virtual pinch gesture based on single touch inputs in accordance with some embodiments.

FIG. 9 is a flow diagram illustrating a method 900 of performing a virtual pinch gesture in accordance with some embodiments. Method 900 is performed at an electronic device (e.g., device 300, FIG. 3, or portable multifunction device 100, FIG. 1) with a display and a multitouch-sensitive surface. In some embodiments, the display is a touch screen display and the touch-sensitive surface is on the display. In some embodiments, the display is separate from the touch-sensitive surface. Some operations in method 900 may be combined and/or the order of some operations may be changed.

As described below, method 900 uses two visual indicators (which correspond to two virtual touches) in conjunction with a single touch input on the touch-sensitive surface to emulate pinch/depinch gestures on a touch-sensitive surface. This allows a user to perform, without using two fingers, an operation (e.g., zooming) that would otherwise require interaction with the touch-sensitive surface of the electronic device using two fingers.

The device displays (902) a pinch/depinch gesture icon (e.g., pinch/depinch gesture icon 518-1 in a virtual gestures menu, FIG. 5K or in first menu 508, FIG. 5J); detects (904) selection of the virtual pinch/depinch gesture icon by a single touch input (e.g., touch gesture 515, FIG. 5K); and, in response to detecting selection of the virtual pinch/depinch gesture icon by the single touch input, displays (906) two visual indicators that correspond to contacts in the virtual pinch/depinch gesture (e.g., FIG. 5L).

The device detects (908) a second single touch input (e.g., touch gesture 519 on the touch-sensitive surface, FIG. 5M); and, in response to detecting the second single touch input (e.g., on the touch-sensitive surface), performs (910) a zooming operation in accordance with the respective virtual pinch/depinch gesture (e.g., as shown in FIGS. 5M-5N). In some embodiments, while the two visual indicators that correspond to contacts in the virtual pinch/depinch gesture are displayed, single touch inputs on the touch-sensitive surface are used to perform actions that correspond to an actual pinch/depinch gesture on the touch-sensitive surface. For example, a single touch input on the touch-sensitive surface may be used to move the two visual indicators apart (depinch) and zoom in the display. Conversely, a single touch input on the touch-sensitive surface may be used to move the two visual indicators together (pinch) and zoom out the display. Thus, a user can use a single touch input to operate an electronic device with a touch-based user interface (e.g., perform virtual multitouch gestures on the display, etc.), even though the user does not actually use multiple fingers.

Figure 10:
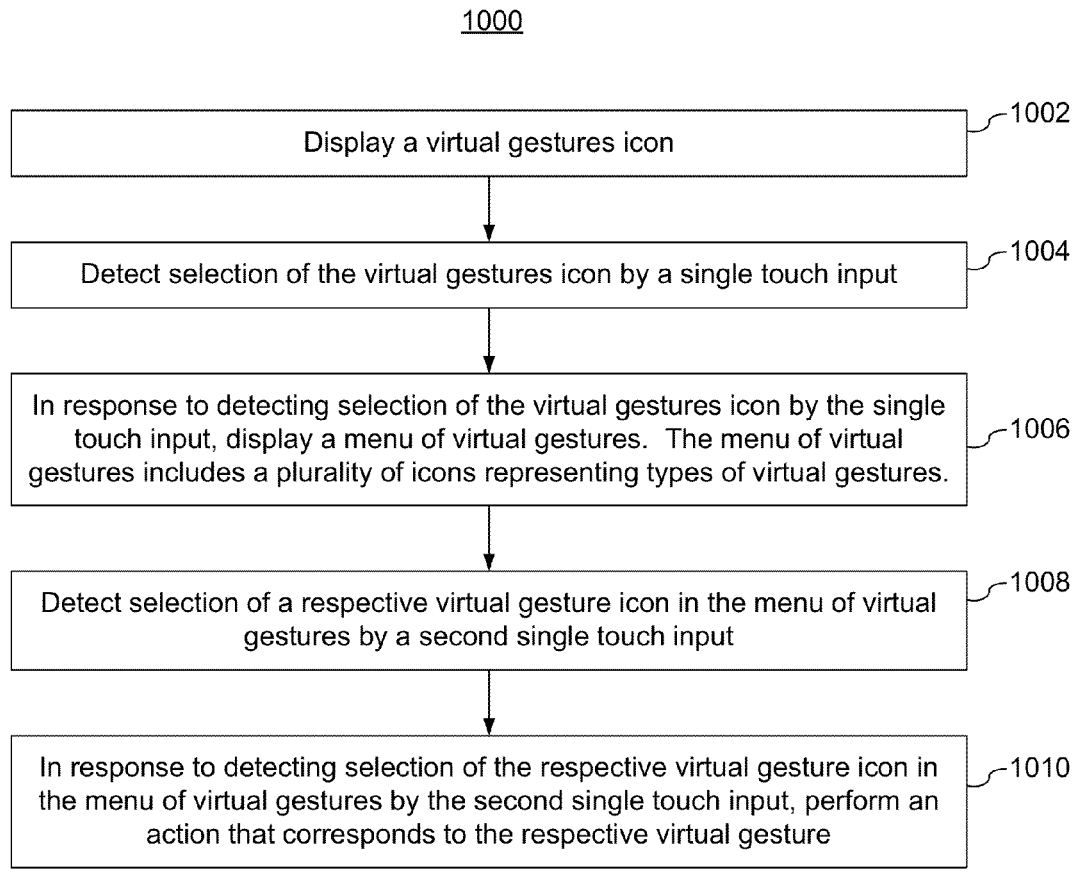
FIG. 10 is a flow diagram illustrating a method of using a menu of virtual gestures based on single touch inputs in accordance with some embodiments.

FIG. 10 is a flow diagram illustrating a method 1000 of using a menu of virtual gestures in accordance with some embodiments. Method 1000 is performed at an electronic device (e.g., device 300, FIG. 3, or portable multifunction device 100, FIG. 1) with a display and a multitouch-sensitive surface. In some embodiments, the display is a touch screen display and the touch-sensitive surface is on the display. In some embodiments, the display is separate from the touch-sensitive surface. Some operations in method 1000 may be combined and/or the order of some operations may be changed.

As described below, method 1000 uses a menu of virtual gestures in conjunction with a single touch input on the touch-sensitive surface to select and emulate actual gestures on a touch-sensitive surface. This allows a user to make, without using multiple fingers, virtual multitouch gestures that produce the same results as those obtained by interacting with the touch-sensitive surface of the electronic device using multiple fingers.

The device displays (1002) a virtual gestures icon (e.g., icon 510-2 in first menu 508, FIG. 5J); detects (1004) selection of the virtual gestures icon by a single touch input (e.g., touch gesture 513, FIG. 5J); and, in response to detecting selection of the virtual gestures icon by the single touch input, displays (1006) a menu of virtual gestures (e.g., menu 516 in FIG. 5K). The menu of virtual gestures includes a plurality of icons representing types of virtual gestures.

The device detects (1008) selection of a respective virtual gesture icon in the menu of virtual gestures by a second single input; and, in response to detecting selection of the respective virtual gesture icon in the menu of virtual gestures by the second single input, performs (1010) an action that corresponds to the respective virtual gesture. For example, in response to selection of virtual four-finger swipe up gesture icon 518-3 in FIG. 5O, the device displays application icon area 530 that includes a plurality of open application icons (FIG. 5P). In some embodiments, the device may perform actions corresponding to certain gestures without displaying visual indicators that correspond to the gestures.

Figure 11:
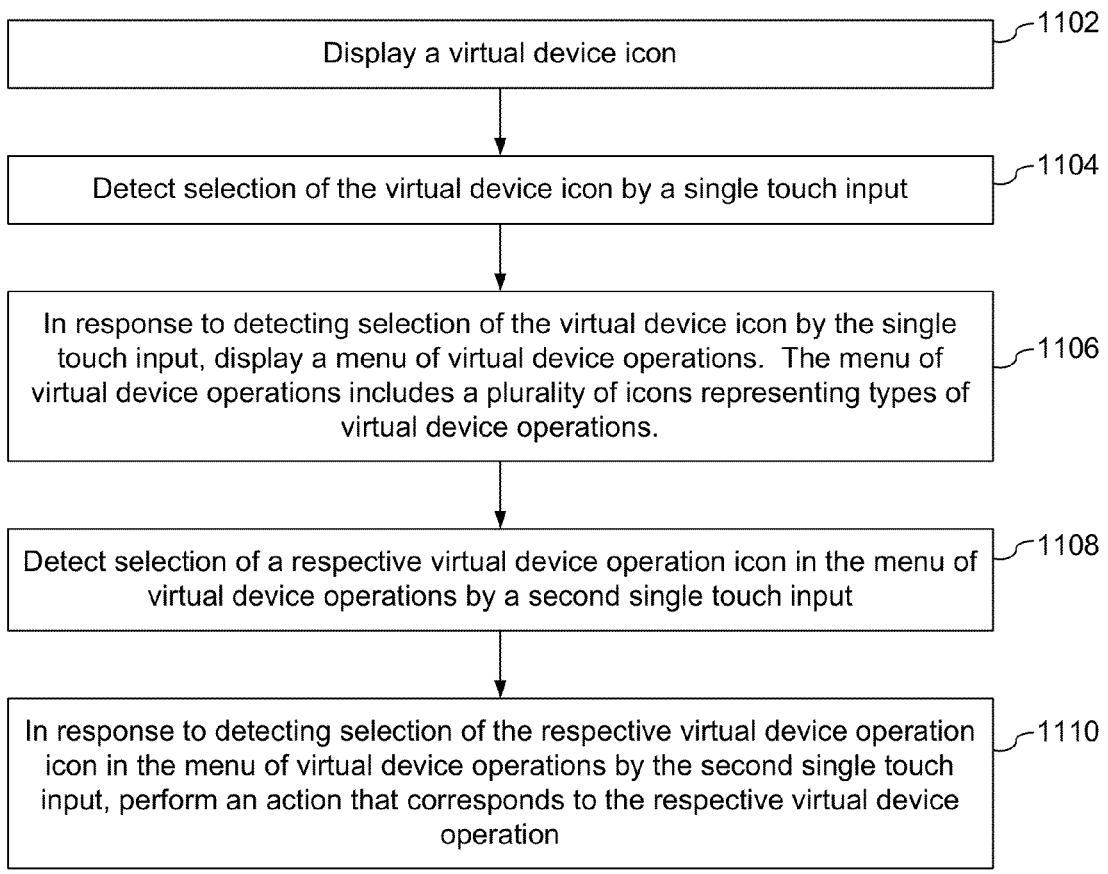
FIG. 11 is a flow diagram illustrating a method of using a menu of virtual device operations based on single touch inputs in accordance with some embodiments.

FIG. 11 is a flow diagram illustrating a method 1100 of using a menu of virtual device operations in accordance with some embodiments. Method 1100 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 1100 may be combined and/or the order of some operations may be changed.

As described below, method 1100 uses a menu of virtual device operations in conjunction with a single touch input on the touch-sensitive surface to select and emulate operations that are normally performed via activation of physical controls on the electronic device (e.g., mute switches, lock switches, volume buttons) or in response to activity detected by an accelerometer (e.g., device shaking or device rotation). This allows a user to perform operations that would otherwise require interaction with the physical controls of the electronic device or the device as a whole.

The device displays (1102) a virtual device icon (e.g., icon 510-3 in first menu 508, FIG. 5Q); detects (1104) selection of the virtual device icon (e.g., by a single touch input, such as touch gesture 523, FIG. 5Q); and, in response to detecting selection of the virtual device icon, displays (1106) a menu of virtual device operations (e.g., menu 522, FIG. 5R). The menu of virtual device operations includes a plurality of icons representing types of virtual device operations. Exemplary virtual device operations may include operations that are normally performed via physical controls on the electronic device, such as: muting and unmuting the ringer and sound effects on the device, which is normally performed via a mute switch; locking the device, which is normally initiated via a lock/unlock switch; increase volume, which is normally performed via a volume up button; decrease volume, which is normally performed via a volume down button. Exemplary virtual device operations may also include shaking the electronic device to perform a predefined operation (e.g., an undo operation) and rotating the electronic device to rotate the display orientation. Operations like shaking and rotation are typically detected via an accelerometer in the electronic device.

The device detects (1108) selection of a respective virtual device operation icon in the menu of virtual device operations by a second single touch input (e.g., by a single-finger tap gesture); and, in response to detecting selection of the respective virtual device operation icon in the menu of virtual device operations by the second single touch input, performs (1110) an action that corresponds to the respective virtual device operation. For example, in response to selection of virtual muting/unmuting icon 524-2 in FIG. 5R, the device mutes or unmutes the ringer and sound effects on the device. Thus, a user can also use single touch inputs to operate the physical controls on the electronic device, even though the user does not actually touch the physical controls on the device.

Figure 12:
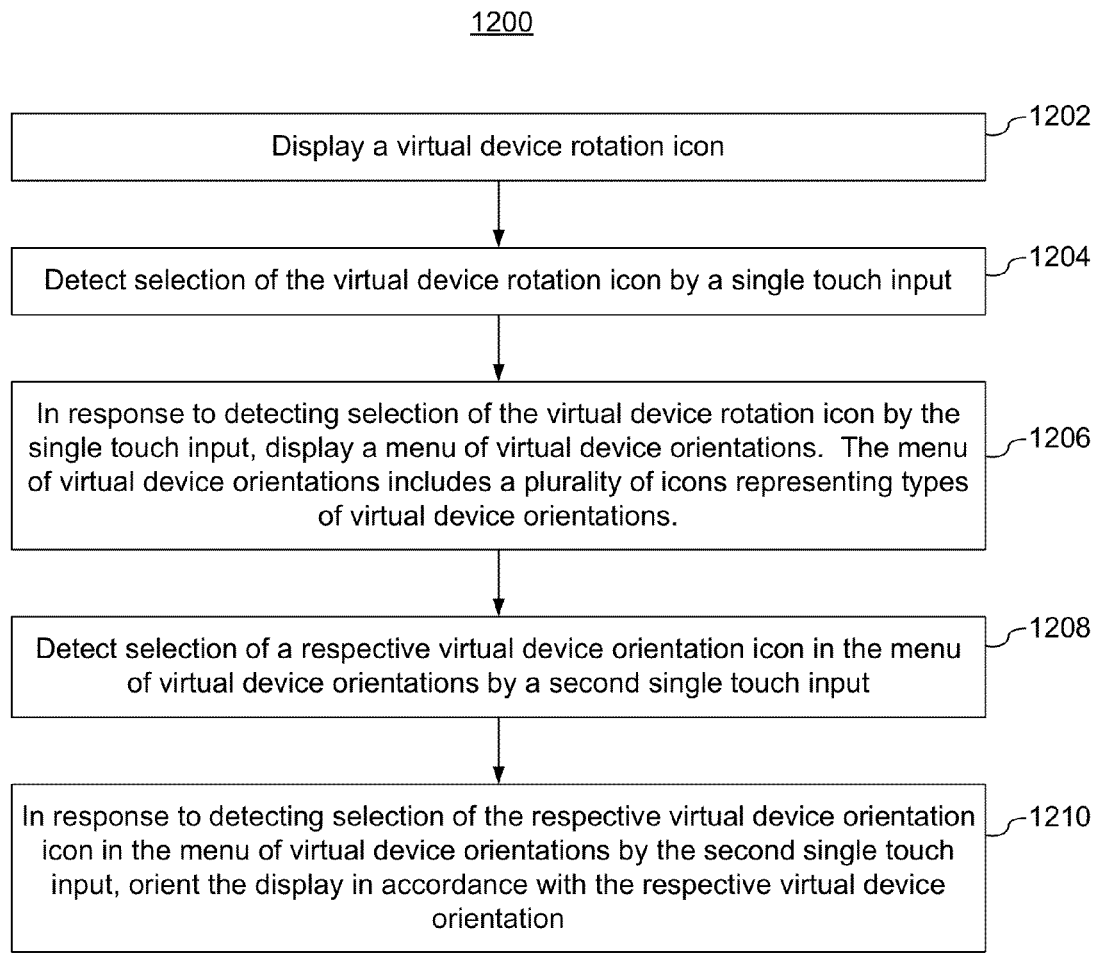
FIG. 12 is a flow diagram illustrating a method of using a menu of virtual device orientations based on single touch inputs in accordance with some embodiments.

FIG. 12 is a flow diagram illustrating a method 1200 of using a menu of virtual device orientations in accordance with some embodiments. Method 1200 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 1200 may be combined and/or the order of some operations may be changed.

As described below, method 1200 uses a menu of virtual device orientations in conjunction with a single touch input on the touch-sensitive surface to control the display orientation. This allows a user to orient the display of the electronic device without physically rotating the electronic device.

The device displays (1202) a virtual device rotation icon (e.g., icon 524-1 in virtual device menu 522, FIG. 5R); detects (1204) selection of the virtual device rotation icon by a single touch input (e.g., touch gesture 525, FIG. 5R); and, in response to detecting selection of the virtual device rotation icon by the single touch input, displays (1206) a menu of virtual device orientations (e.g., menu 526, FIG. 5S). The menu of virtual device orientations includes a plurality of icons representing types of virtual device orientations (e.g., virtual portrait orientation icon 528-1, virtual landscape orientation left icon 528-2, virtual landscape orientation right icon 528-4, and virtual upside down portrait orientation icon 528-3, FIG. 5S).

The device detects (1208) selection of a respective virtual device orientation icon in the menu of virtual device orientations by a second single touch input (e.g., touch gesture 527, FIG. 5S). In response to detecting selection of the respective virtual device orientation icon in the menu of virtual device orientations by the second single touch input, the device orients (1210) the display in accordance with the respective virtual device orientation. For example, in response to selection of virtual landscape orientation left icon 528-2 in FIG. 5S, the device orients the user interface on display to that shown in FIG. 5T.

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A and 3) are all included within the scope of protection of the invention.

The operations described above with reference to FIGS. 6A-6D, 7, 8, 9, 10, 11, and 12 may be implemented by components depicted in FIGS. 1A-1B. For example, detecting operation 608, display replacing operation 610, and performing operation 628 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a single touch input detected on touch-sensitive display 112 corresponds to a predefined event or sub-event, such as selection of an object on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An electronic device, comprising:
    a display;
    a touch-sensitive surface;
    one or more processors;
    memory; and
    one or more programs, wherein the one or more programs are stored in the memory and configured to be executed by the one or more processors, the one or more programs including instructions for:
        displaying, on the display, a first visual indicator;
        detecting a first single touch input on the touch-sensitive surface at a location that corresponds to the first visual indicator;
        in response to detecting the first single touch input on the touch-sensitive surface at the location that corresponds to the first visual indicator, replacing display of the first visual indicator with display of a first menu, the first menu including a virtual touches selection icon, wherein in response to detecting selection of the virtual touches selection icon, a menu of virtual multitouch contacts comprising a plurality of icons representing types of virtual multitouch contacts is displayed;
        detecting selection of a respective virtual multitouch contacts icon in the menu of virtual multitouch contacts; and,
        in response to detecting selection of the respective virtual multitouch contacts icon in the menu of virtual multitouch contacts, displaying one or more second visual indicators that correspond to the respective virtual multitouch contacts icon.

2. The electronic device of claim 1, wherein the first visual indicator is configured to move in accordance with a touch gesture by a single touch on the touch-sensitive surface.

3. The electronic device of claim 1, wherein the first visual indicator is located at a periphery of the display when no touch input is detected on the touch-sensitive surface.

4. The electronic device of claim 1, wherein the first menu includes icons displayed radially about a center of the first menu.

5. The electronic device of claim 1, wherein a first user interface is displayed on the display immediately prior to detecting the first single touch input on the touch-sensitive surface, and the first menu is displayed over the first user interface.

6. The electronic device of claim 1, wherein the one or more programs include instructions for:
    in response to detecting the first single touch input, displaying the first menu in a center region of the display.

7. The electronic device of claim 1, wherein the one or more programs include instructions for:
    while displaying the first menu on the display, detecting a second single touch input on the touch-sensitive surface at a location that does not correspond to the first menu; and,
    in response to detecting the second single touch input on the touch-sensitive surface, replacing display of the first menu with display of the first visual indicator.

8. The electronic device of claim 1, wherein the one or more programs include instructions for:
    while displaying the first menu on the display, waiting to detect input on the touch-sensitive surface for more than a predefined time period; and,
    in response to waiting to detect input on the touch-sensitive surface for more than the predefined time period, replacing display of the first menu with display of the first visual indicator.

9. The electronic device of claim 1, wherein the instructions for displaying the second visual indicators include instructions for displaying a number of visual indicators that correspond to the respective virtual multitouch contacts icon.

10. The electronic device of claim 1, wherein the one or more programs include instructions for:
    in response to detecting selection of the respective virtual multi touch contacts icon in the menu of virtual multi touch contacts, ceasing to display the menu of virtual multi touch contacts and redisplaying the first visual indicator.

11. The electronic device of claim 1, wherein the one or more programs include instructions for:
  while displaying the one or more second visual indicators, detecting a third single touch on the touch-sensitive surface; and,
  in response to detecting the third single touch on the touch-sensitive surface:
    moving the one or more second visual indicators to a first display location on the display, the first display location corresponding to an initial location of the third single touch on the touch-sensitive surface;
    detecting movement of the third single touch across the touch-sensitive surface;
    in response to detecting the movement of the third single touch across the touch-sensitive surface, moving the one or more second visual indicators on the display in accordance with the movement of the third single touch across the touch-sensitive surface;
  and,
    while moving the one or more second visual indicators in accordance with the movement of the third single touch across the touch-sensitive surface, performing an operation that corresponds to the movement of the one or more second visual indicators in accordance with the movement of the third single touch across the touch-sensitive surface.

12. The electronic device of claim 1, wherein the one or more programs include instructions for:
  displaying a virtual gestures icon;
  detecting selection of the virtual gestures icon;
  in response to detecting selection of the virtual gestures icon, displaying a menu of virtual gestures, the menu of virtual gestures including a plurality of icons representing types of virtual gestures;
  detecting selection of a respective virtual gesture icon in the menu of virtual gestures; and,
  in response to detecting selection of the respective virtual gesture icon in the menu of virtual gestures, performing an action that corresponds to the respective virtual gesture.

13. The electronic device of claim 1, wherein the one or more programs include instructions for:
  displaying a virtual gestures icon;
  detecting selection of the virtual gestures icon;
  in response to detecting selection of the virtual gestures icon, displaying a menu of virtual gestures, the menu of virtual gestures including a plurality of icons representing types of virtual gestures;
  detecting selection of a respective virtual gesture icon in the menu of virtual gestures;
  in response to detecting selection of the respective virtual gesture icon in the menu of virtual gestures, displaying a number of visual indicators that correspond to the respective virtual gesture icon;
  detecting a fourth single touch input from on the touch-sensitive surface; and,
  in response to detecting the fourth single touch input on the touch-sensitive surface, performing an operation in accordance with the respective virtual gesture.

14. The electronic device of claim 13, wherein the one or more programs include instructions for:
  in response to detecting the fourth single touch input on the touch-sensitive surface, moving the displayed visual indicators that correspond to the respective virtual gesture to simulate movement of multiple contacts on the touch-sensitive surface.

15. The electronic device of claim 1, wherein the one or more programs include instructions for:
  displaying a pinch/depinch gesture icon;
  detecting selection of the virtual pinch/depinch gesture icon;
  in response to detecting selection of the virtual pinch/depinch gesture icon, displaying two visual indicators that correspond to contacts in the virtual pinch/depinch gesture;
  detecting a fifth single touch input on the touch-sensitive surface; and,
  in response to detecting the fifth single touch input on the touch-sensitive surface, performing an operation in accordance with the virtual pinch/depinch gesture.

16. The electronic device of claim 15, wherein the one or more programs include instructions for performing a zooming operation in accordance with the virtual pinch/depinch gesture.

17. The electronic device of claim 1, wherein the one or more programs include instructions for:
  displaying a virtual device icon;
  detecting selection of the virtual device icon;
  in response to detecting selection of the virtual device icon, displaying a menu of virtual device operations, the menu of virtual device operations including a plurality of icons representing types of virtual device operations;
  detecting selection of a respective virtual device operation icon in the menu of virtual device operations; and,
  in response to detecting selection of the respective virtual device operation icon in the menu of virtual device operations, performing an action that corresponds to the respective virtual device operation.

18. The electronic device of claim 1, wherein the one or more programs include instructions for:
  displaying a virtual device rotation icon;
  detecting selection of the virtual device rotation icon;
  in response to detecting selection of the virtual device rotation icon, displaying a menu of virtual device orientations, the menu of virtual device orientations including a plurality of icons representing types of virtual device orientations;
  detecting selection of a respective virtual device orientation icon in the menu of virtual device orientations; and,
  in response to detecting selection of the respective virtual device orientation icon in the menu of virtual device orientations, orienting the display in accordance with the respective virtual device orientation.

19. The electronic device of claim 1, wherein the device includes a home button, and the one or more programs include instructions for:
  displaying a home button icon;
  detecting selection of the home button icon; and,
  in response to detecting selection of the home button icon, performing an action that corresponds to activation of the home button.

* * * * *